US012518887B2

(12) United States Patent
Keum et al.

(10) Patent No.: US 12,518,887 B2
(45) Date of Patent: Jan. 6, 2026

(54) SCATTERED RAY-SHIELDING UNDERWEAR FOR RADIATION THERAPY

(71) Applicant: INDUSTRY-ACADEMIC COOPERATION FOUNDATION, YONSEI UNIVERSITY, Seoul (KR)

(72) Inventors: Ki Chang Keum, Seoul (KR); Seung Kwon Ahn, Seoul (KR); Yong Bae Kim, Seoul (KR); Dong Min Son, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 350 days.

(21) Appl. No.: 18/283,946

(22) PCT Filed: Mar. 2, 2022

(86) PCT No.: PCT/KR2022/002909
§ 371 (c)(1),
(2) Date: Sep. 25, 2023

(87) PCT Pub. No.: WO2022/211290
PCT Pub. Date: Oct. 6, 2022

(65) Prior Publication Data

US 2024/0055146 A1 Feb. 15, 2024

(30) Foreign Application Priority Data

Mar. 30, 2021 (KR) ........................ 10-2021-0040772
Aug. 30, 2021 (KR) ........................ 10-2021-0114949

(51) Int. Cl.
*G21F 3/02* (2006.01)
*G21F 1/08* (2006.01)

(52) U.S. Cl.
CPC . *G21F 3/02* (2013.01); *G21F 1/08* (2013.01)

(58) Field of Classification Search
CPC .................................... G21F 3/02; G21F 1/08
See application file for complete search history.

(56) References Cited

U.S. PATENT DOCUMENTS 3,968,803 A 7/1976 Hyman
2003/0025089 A1 * 2/2003 Featherby ............ H01L 23/057
257/E23.114

(Continued)

FOREIGN PATENT DOCUMENTS

CN 119044215 A * 11/2024
JP 2007332520 A 12/2007

(Continued)

OTHER PUBLICATIONS

International Search Report with English Translation and Written Opinion for PCT Application No. PCT/KR2022/002909, dated Jun. 14, 2022, 12 pages.

(Continued)

*Primary Examiner* — Nicole M Ippolito
(74) *Attorney, Agent, or Firm* — Dickinson Wright PLLC

(57) ABSTRACT

Disclosed is scattered ray-shielding underwear for radiation therapy. The scattered ray-shielding underwear for radiation therapy, according to an embodiment of the present disclosure, comprises an outer underwear formed of a first shielding material and an inner underwear formed of a second shielding material, wherein the first shielding material has a greater atomic number than the second shielding material, and thus, during radiation therapy, the outer underwear can shield scattered rays generated by high-energy radiation, and the inner underwear can shield braking radiation, and exposure of a patient to scattered rays and braking radiation can be almost completely blocked.

20 Claims, 21 Drawing Sheets

(56) References Cited

U.S. PATENT DOCUMENTS

| | | | | |
|---|---|---|---|---|
| 2004/0198177 | A1 | 10/2004 | Jankowski | |
| 2011/0001065 | A1* | 1/2011 | Popa-Simil | G21F 3/035 250/505.1 |
| 2013/0316616 | A1 | 11/2013 | Thompson | |
| 2016/0165962 | A1 | 6/2016 | Hayes | |
| 2018/0334763 | A1* | 11/2018 | Liguori | G21F 1/10 |

FOREIGN PATENT DOCUMENTS

| | | | |
|---|---|---|---|
| JP | 2015225062 | A | 12/2015 |
| KR | 200261636 | Y1 | 1/2002 |
| KR | 1020120119158 | A | 10/2012 |
| KR | 101585085 | B1 | 1/2016 |
| KR | 1020170004377 | U | 12/2017 |
| KR | 101967664 | B1 | 8/2018 |
| KR | 1020180096801 | A | 8/2018 |
| KR | 102129401 | B1 | 7/2020 |
| KR | 102173342 | B1 | 11/2020 |

OTHER PUBLICATIONS

Non-Final Office Action for Korean Application No. 10-2021-0114949, dated Apr. 20, 2023, 10 pages.

Final Office Action for Korean Application No. 10-2021-0114949, dated Jun. 27, 2023, 8 pages.

Non-Final Office Action for Korean Application No. 10-2021-0040772, dated May 22, 2023, 13 pages.

Notice of Allowance for Korean Application No. 10-2021-0040772, dated Sep. 11, 2023, 4 pages.

* cited by examiner

SCATTERED RAY-SHIELDING UNDERWEAR FOR RADIATION THERAPY

CROSS-REFERENCE TO RELATED APPLICATION(S)

This present application is a national stage application of International Patent Application No. PCT/KR2022/002909, filed Mar. 2, 2022, which claims priority to Korean Patent Application No. 10-2021-0040772, filed Mar. 30, 2021 and Korean Patent Application No. 10-2021-0114949, filed Aug. 30, 2021, the disclosures of which are hereby incorporated by reference in their entireties.

TECHNICAL FIELD

The present invention relates to scattered ray-shielding underwear for radiation therapy, and more particularly, to scattered ray-shielding underwear for radiation therapy which shields scattered rays and braking radiation generated due to high-energy radiation during radiation therapy and thus prevents unnecessary exposure of a patient thereto so as to prevent cancer.

BACKGROUND ART

Early diagnosis through medical examination enables early diagnosis of tumors, and increases the number of patients who undergo both surgical operation and chemotherapy or radiation therapy together. A large proportion of cancer patients undergoes radiation therapy due to increase in target objects of radiation therapy and development of radiation therapy equipment. In radiation therapy, normal tissues should be irradiated with the minimum amount of radiation, and a high-energy dose of radiation should be concentrated on tumors so as to increase treatment effect.

An important factor which should be considered in use of high-energy radiation during radiation therapy is the amount of a surface dose exposed to a patient together with a prescription dose to a tumor. Because, during radiation therapy, even a low radiation dose may cause a stochastic disorder of a patient and may shorten the lifespan of the patient, in order to achieve justification of radiation, exposure of parts of the patient's body other than a radiation therapy site to radiation should be reduced as much as possible extent.

Scattered rays generated by a medical linear accelerator are caused by an aperture, a filter, air, a subject, etc. Radiation emitted by a radiation source is scattered by surrounding substances, and then reaches a patient. Even a low radiation dose to the surroundings except for an irradiation surface compared to an irradiation surface radiation dose causes increase in a stochastic influence on the patient.

That is, scattered rays generated during radiation therapy may cause secondary radiation exposure of other organs and tissues than a target part for treatment. Recently, shielding tools used to reduce radiation exposure are mainly used to protect hospital workers from radiation. Further, there is a lack of protection of patients from radiation.

With regard to this, Korean Patent Registration No. 1967664 (referred to hereinafter as 'Related Art Document') discloses a protector for medical imaging. The protector for medical imaging of Related Art Document includes a shielding unit including a contrast material and a gap maintenance member attached to the bottom surface of the shielding unit and configured to space the shielding unit apart from a body part by a designated gap, and the thickness of the gap maintenance member is 10 to 40 mm.

The protector for medical imaging of Related Art Document is advantageous in that it may effectively protect a patient's specific body part having a high radiation sensitivity, such as the breast, thyroid gland, crystalline lens, or genital gland of a woman, during medical imaging, such as computed tomography (CT) scan, general X-ray examination, or fluoroscopy, using the shielding unit including the contrast material which may shield radiation.

The shielding unit may be manufactured to be deformable depending on patient's body curvature, and may be deformed into various shapes. Further, an adhesive unit, such as an adhesive tape, is provided on the bottom surface of the gap maintenance member, and thus, the gap maintenance member is fixed to the skin. However, as the deformation amount of an elastic material increases, the elastic recovery of the elastic material increases. Further, there is a certain limit to the adhesiveness of the adhesive tape. Therefore, when the shielding unit is deformed so as to fit with a protruding part, such as the breast of a woman, the part of the shielding unit attached to the protruding part is easily detached from the protruding part due to the elastic recovery of the material.

Various types of radiation, such as high-energy photon beams, electron beams, proton beams, and heavy ion beams, are used in radiation therapy. Further, properties of scattered rays are varied depending on the type of radiation. Therefore, the scattered rays may be effectively shielded using a different shield depending on the type of radiation.

Braking radiation is electromagnetic radiation produced by deceleration of charged particles, such as electrons, when the charged particles are deflected by other charged particles, such as atomic nuclei. When an atomic nucleus attracts and deflects a beta (β-) ray and thus an acceleration is changed, photons with energy equal to an energy difference due to the change in the acceleration of the beta (β-) ray are released.

Negatively charged (−1) beta (β-) rays are attracted by positively charged (+) atomic nuclei. That is, the beta rays are deflected toward the atomic nuclei, and kinetic energy is reduced. As a result, braking radiation is emitted equal to an energy difference.

When substances having high atomic numbers, such as lead (82Pb), tungsten (74W), bismuth (83Bi), barium (56Ba), cadmium (48Cd), tin (50Sn), and bismuth alloys (bismuth, cadmium, tin, lead, and indium), are used as high-energy radiation shields, the degree of deflection of the beta rays is increased, and thus, probability of occurrence of braking radiation is raised. However, the protector for medical imaging of Related Art Document is not capable of preventing exposure to braking radiation, when a substance having a high atomic number is used as a high-energy radiation shield.

On the contrary, in the case of low-energy radiation, scattered rays may be effectively shielded only using substances having low atomic numbers, such as beryllium (4Be), aluminum (13Al), copper (29Cu), zinc (30Zn), water, paraffin, and polyethylene. The reason for this is that beta rays release a larger amount of braking X-rays (braking radiation) when beta rays react with a substance having a high atomic number.

Therefore, beta rays should be shielded using a substance having a low atomic number in order to reduce a conversion rate into braking X-rays. However, the protector for medical imaging of Related Art Document is not capable of completely preventing exposure to a small amount of generated braking X-rays, even when a substance having a low atomic number is used as a low-energy radiation shield.

DISCLOSURE

Technical Problem

Therefore, the present invention has been made in view of the above problems, and it is an object of the present invention to provide scattered ray-shielding underwear for radiation therapy which may shield scattered rays and braking radiation generated due to high-energy radiation during radiation therapy.

It is another object of the present invention to provide scattered ray-shielding underwear for radiation therapy which may firmly maintain a shielded form of the breasts of a woman during radiation therapy of a body part close to the breasts, such as the liver, pancreas, spleen, kidneys, cervical vertebral, lumbar, head and neck, etc., and easily release the shielded form of the breasts upon completion of radiation therapy.

Further, it is yet another object of the present invention to provide scattered ray-shielding underwear for radiation therapy which may almost completely prevent exposure of the breasts of a woman to braking radiation and braking X-rays generated due to high-energy radiation and low-energy radiation during radiation therapy of a body part close to the breasts.

Technical Solution

In accordance with one aspect of the present invention, the above and other objects can be accomplished by the provision of scattered ray-shielding underwear for radiation therapy including outer underwear formed of a first shielding material and inner underwear formed of a second shielding material.

Further, in order to achieve the above and other objects, in the scattered ray-shielding underwear according to one aspect of the present invention, the first shielding material may have a higher atomic number than the second shielding material.

Further, in order to achieve the above and other objects, in the scattered ray-shielding underwear according to one aspect of the present invention, the outer underwear may include an outer top and an outer bottom.

Further, in order to achieve the above and other objects, in the scattered ray-shielding underwear according to one aspect of the present invention, the inner underwear may include an inner top and an inner bottom.

Further, in order to achieve the above and other objects, the scattered ray-shielding underwear according to one aspect of the present invention may further include first coupling members coupled between the outer top and the inner top so as to maintain an overlapping state between the outer top and the inner top.

Further, in order to achieve the above and other objects, the scattered ray-shielding underwear according to one aspect of the present invention may further include second coupling members coupled between the outer bottom and the inner bottom so as to maintain an overlapping state between the outer bottom and the inner bottom.

Further, in order to achieve the above and other objects, the scattered ray-shielding underwear according to one aspect of the present invention may further include third coupling members coupled between the top and the bottom so as to maintain a coupled state between the top and the bottom.

Further, in order to achieve the above and other objects, in the scattered ray-shielding underwear according to one aspect of the present invention, the third coupling members may be coupled between the outer top and the inner bottom so as to maintain an overlapping state between the outer top and the inner bottom.

Further, in order to achieve the above and other objects, in the scattered ray-shielding underwear according to one aspect of the present invention, the third coupling members may be coupled between the inner top and the outer bottom so as to maintain an overlapping state between the inner top and the outer bottom.

Further, in order to achieve the above and other objects, in the scattered ray-shielding underwear according to one aspect of the present invention, the third coupling members may be Velcro strips configured to extend in a vertical direction so as to adjust a height of a coupling area therebetween.

Further, in order to achieve the above and other objects, the scattered ray-shielding underwear according to one aspect of the present invention may further include fourth coupling members provided on an outer surface of the outer top and configured to fold up a lower part of the outer top so as to maintain an overlapping state thereof with an upper part of the outer top.

Further, in order to achieve the above and other objects, in the scattered ray-shielding underwear according to one aspect of the present invention, the fourth coupling members may be a plurality of Velcro strips spaced apart from one another in a vertical direction so as to adjust a height of a coupling area therebetween.

Further, in order to achieve the above and other objects, in the scattered ray-shielding underwear according to one aspect of the present invention, the fourth coupling members may be Velcro strips configured to extend in the vertical direction so as to adjust a height of a coupling area therebetween.

Further, in order to achieve the above and other objects, in the scattered ray-shielding underwear according to one aspect of the present invention, the first shielding material may be a material selected from a first group consisting of elements having high atomic numbers, including lead, tungsten, bismuth, barium, cadmium, and tin, bismuth alloys, and combinations thereof.

Further, in order to achieve the above and other objects, in the scattered ray-shielding underwear according to one aspect of the present invention, the outer underwear may be formed of a first film fabric formed by stacking films formed of the same material or different materials selected from the first group.

Further, in order to achieve the above and other objects, in the scattered ray-shielding underwear according to one aspect of the present invention, the outer underwear may be formed of a first woven fabric woven from yarns formed of the same material or different materials selected from the first group.

Further, in order to achieve the above and other objects, in the scattered ray-shielding underwear according to one aspect of the present invention, the first woven fabric may include one or more first coating layers formed of materials selected from the first group other than the selected material (s).

Further, in order to achieve the above and other objects, in the scattered ray-shielding underwear according to one aspect of the present invention, the second shielding material may be a material selected from a second group consisting of elements having low atomic numbers, including beryllium, aluminum, copper, and zinc, paraffin, plastics, and combinations thereof.

Further, in order to achieve the above and other objects, in the scattered ray-shielding underwear according to one aspect of the present invention, the inner underwear may be formed of a second film fabric formed by stacking films formed of the same material or different materials selected from the second group.

Further, in order to achieve the above and other objects, in the scattered ray-shielding underwear according to one aspect of the present invention, the inner underwear may be formed of a second woven fabric woven from yarns formed of the same material or different materials selected from the second group.

Further, in order to achieve the above and other objects, in the scattered ray-shielding underwear according to one aspect of the present invention, the second woven fabric may include one or more second coating layers formed of materials selected from the second group other than the selected material(s).

Further, in order to achieve the above and other objects, the scattered ray-shielding underwear according to one aspect of the present invention may further include a neck band including an outer band formed of the first shielding material and configured to surround the neck so as to protect the neck, and an inner band coupled to the outer band and formed of the second shielding material.

Further, in order to achieve the above and other objects, the scattered ray-shielding underwear according to one aspect of the present invention may further include a scattered ray-shielding brassiere, to which a radiation shielding principle for radiation therapy is applied.

Further, in order to achieve the above and other objects, the scattered ray-shielding brassiere may include a wearing member configured to surround a patient's chest and to cover both of patient's breasts, first shields detachably attached to a surface of the wearing member and configured to cover both of the patient's breasts, and second shields detachably attached to surfaces of the first shields and configured to cover both of the patient's breasts.

Further, in order to achieve the above and other objects, one of the first shields and the second shields may include a substance having a relatively high atomic number, and a remaining one of the first shields and the second shields may include a substance having a relatively low atomic number.

Further, in order to achieve the above and other objects, the first shields may include a shield 1A configured to cover one of the patient's breasts and a shield 1B configured to cover a remaining one of the patient's breasts, and at least one of the shield 1A and the shield 1B may cover a part of a patient's body between both of the patient's breasts.

Further, in order to achieve the above and other objects, the second shields may include a shield 2A configured to cover one of the patient's breasts and a shield 2B configured to cover a remaining one of the patient's breasts, and at least one of the shield 2A and the shield 2B may cover the part of the patient's body between both of the patient's breasts.

Further, in order to achieve the above and other objects, the wearing member may include a back part connected to a patient's back, a first front part configured to cover one of the patient's breasts and connected to the back part, and a second front part configured to cover a remaining one of the patient's breasts and connected to the back part, the first front part and the second front part may be detachably coupled by a coupling member between both of the patient's breasts, and the first shields a cover the coupling member.

Further, in order to achieve the above and other objects, the scattered ray-shielding brassiere may further include shoulder bands configured such that one end of each thereof is coupled to the wearing member below the patient's breasts, and a remaining one end of each thereof is detachably coupled to the back part, and, when a coupled position of the remaining end of each of the shoulder bands to the back part is adjusted, a position of a corresponding one of the patients breasts may be adjusted.

Further, in order to achieve the above and other objects, first Velcro strips may be provided on the back part, second Velcro strips detachably coupled to the first Velcro strips may be provided on the remaining ends of the shoulder bands, and third Velcro strips detachably coupled to the second Velcro strips may be provided on the remaining ends of the shoulder bands.

Further, in order to achieve the above and other objects, a fourth Velcro strip may be provided at one side of the remaining end of each of the shoulder bands based on a corresponding one of the second Velcro strips, a fifth Velcro strip may be provided at the other side of the remaining end of each of the shoulder bands based on the corresponding one of the second Velcro strips, and a rolled-up state of the remaining end of each of the shoulder bands in a length direction may be selectively maintained by detachable coupling between the fourth Velcro strip and the fifth Velcro strip.

Advantageous Effects

The scattered ray-shielding underwear according to one aspect of the present invention includes outer underwear formed of the first shielding material and inner underwear formed of the second shielding material, the first shielding material has a higher atomic number than the second shielding material, and thus, during radiation therapy, the outer underwear may shield scattered rays generated due to high-energy radiation, and the inner underwear may shield braking radiation during radiation therapy, and thus, exposure of a patient to scattered rays and braking radiation may be almost completely prevented.

Further, in the scattered ray-shielding underwear according to one aspect of the present invention, each of the outer underwear and the inner underwear may include the outer top and the outer bottom, and thus, a patient may easily wear and take off the outer underwear and the inner underwear, and only damaged parts may be simply replaced.

Further, the scattered ray-shielding underwear according to one aspect of the present invention may further include the coupling members configured to maintain the overlapping state between the outer underwear and the inner underwear, and may thus maintain the coupled state between the outer underwear and the inner underwear after the patient has donned the outer underwear and the inner underwear.

Further, the scattered ray-shielding underwear according to one aspect of the present invention may further include the coupling members configured to maintain the coupled state between the top and the bottom, and may thus prevent exposure of the patient's skin due to separation of the top and the bottom from each other.

Further, in the scattered ray-shielding underwear according to one aspect of the present invention, the coupling members configured to maintain the coupled state between the top and the bottom may be Velcro strips configured to extend in the vertical direction so as to adjust the height of the coupling area therebetween, and may thus adjust the height of the coupling area therebetween depending on the patient's body shape.

Further, the scattered ray-shielding underwear according to one aspect of the present invention may further include the fourth coupling members provided on the outer surface of the outer top and configured to fold up the lower part of the outer top so as to maintain the overlapping state thereof with the upper part of the outer top, and thus, may shield scattered rays while accurately adjusting a scattered ray shielding area without disturbing radiation therapy of a radiation therapy site, and may expose only a part of the patient's body which needs treatment.

Further, in the scattered ray-shielding underwear according to one aspect of the present invention, the fourth coupling members may be the plurality of Velcro strips spaced apart from one another in the vertical direction so as to adjust the height of the coupling area therebetween, and may thus expose the part of the patient's body which needs treatment so as to have a proper size.

Further, in the scattered ray-shielding underwear according to one aspect of the present invention, the fourth coupling members may be the Velcro strips configured to extend in the vertical direction so as to adjust the height of the coupling area therebetween, and may thus expose the part of the patient's body which needs treatment so as to have a proper size.

Further, in the scattered ray-shielding underwear according to one aspect of the present invention, each of the outer underwear and the inner underwear may be formed by cutting a film fabric formed by stacking films formed of the same material or different materials, and may thus have excellent shielding performance and flexibility.

Further, in the scattered ray-shielding underwear according to one aspect of the present invention, each of the outer underwear and the inner underwear may be formed by cutting a woven fabric woven from yarns formed of the same material or different materials, and may thus have excellent shielding performance and flexibility.

Further, in the scattered ray-shielding underwear according to one aspect of the present invention, each of the outer underwear and the inner underwear may be formed by cutting a woven fabric woven from yarns formed of the same material or different materials and including one or more coating layers formed of other materials, and may thus have excellent shielding performance and flexibility.

Further, the scattered ray-shielding underwear according to one aspect of the present invention may further include additional underwear attached to and detached from the inner surface of the inner underwear, and the additional underwear may shield scattered rays generated from the outer underwear or the inner underwear, and may thus almost completely prevent exposure of the patient to various types of scattered rays.

Further, the scattered ray-shielding underwear according to one aspect of the present invention may further include intermediate underwear located between the outer underwear and the inner underwear, and the intermediate underwear may shield scattered rays generated from the outer underwear, and may thus almost completely prevent exposure of the patient to various types of scattered rays.

Further, the scattered ray-shielding underwear according to one aspect of the present invention may further include wearing underwear attached to and detached from the inner surface of the inner underwear, and the wearing underwear may block cold air generated from the inner underwear and improve comfort of wearing felt by the patient.

Further, the scattered ray-shielding underwear according to one aspect of the present invention may further include the neck band including the outer band formed of the first shielding material and configured to surround the neck so as to protect the neck, and the inner band coupled to the outer band and formed of the second shielding material, and may thus almost completely prevent exposure of the patient's neck to radiation.

Further, in the scattered ray-shielding underwear according to one aspect of the present invention, the first shields may be detachably attached to the surface of the wearing member configured to cover both of the patient's breasts, the second shields may be detachably attached to the surfaces of the first shields, and may thus firmly maintain the shielded form of the breasts of a woman during radiation therapy of a body part close to the breasts, such as the liver, pancreas, spleen, kidneys, cervical vertebral, lumbar, head and neck, etc., and easily release the shielded form of the breasts upon completion of radiation therapy.

Further, in the scattered ray-shielding underwear according to one aspect of the present invention, one of the first shields and the second shields may include a substance having a relatively high atomic number, a remaining one of the first shields and the second shields may include a substance having a relatively low atomic number, and thus, during radiation therapy of a body part close to the breasts, exposure of the breasts to braking radiation and braking X-rays generated due to high-energy radiation and low-energy radiation may be almost completely prevented.

DESCRIPTION OF REFERENCE NUMERALS AND MARKS OF PRINCIPAL PARTS OF DRAWINGS

| | |
|---|---|
| 10: scattered ray-shielding underwear for radiation therapy | |
| 100: outer underwear | |
| 110: first film fabric | 111: film |
| 112: film | 120: first woven fabric |
| 121: first yarn | 122: second yarn |

-continued

| | |
|---|---|
| 123: first coating layer | 130: outer top |
| 140: outer bottom | 200: inner underwear |
| 210: second film fabric | 211: film |
| 212: film | 220: second woven fabric |
| 221: third yarn | 222: fourth yarn |
| 223: second coating layer | 230: inner top |
| 240: inner bottom | 300: first coupling member |
| 310: first Velcro strip | 320: second Velcro strip |
| 400: second coupling member | 410: third Velcro strip |
| 420: fourth Velcro strip | 500: third coupling member |
| 510: fifth Velcro strip | 520: sixth Velcro strip |
| 600: fourth coupling member | 610: seventh Velcro strip |
| 620: eighth Velcro strip | 700: intermediate underwear |
| 800: additional underwear | 900: neck band |
| 910: outer band | 920: inner band |
| 930: fifth coupling member | 931: ninth Velcro strip |
| 932: tenth Velcro strip | 1000: wearing underwear |
| 1100: disposable underwear | 2: couch |
| 3: radiation therapy apparatus | 10A: brassiere |
| 100A: wearing member | 200A: first shield |
| 110A: back part | 210A: shield 1A |
| 120A: front part | 220A: shield 1B |
| 121A: first front part | V1A: attachment Velcro strip 1A |
| 122A: second front part | V1B: attachment Velcro strip 1B |
| 130A: coupling member | 400A: shoulder band |
| 140A: shoulder part | 410A: first shoulder band |
| 141A: first shoulder part | 420A: second shoulder band |
| 142A: second shoulder part | VC1: first Velcro strip |
| 300A: second shield | VC2: second Velcro strip |
| 310A: shield 2A | VC3: third Velcro strip |
| 320A: shield 2B | VC4: fourth Velcro strip |
| V2A: attachment Velcro strip 2A | VC5: fifth Velcro strip |
| V2B: attachment Velcro strip 2B | |

Best Mode

Hereinafter, reference will be made in detail to exemplary embodiments of the present invention, examples of which are illustrated in the accompanying drawings.

However, in the following description of the embodiments of the present invention, a detailed description of known functions and configurations incorporated herein will be omitted when it may make the subject matter of the present invention rather unclear.

Figure 13:
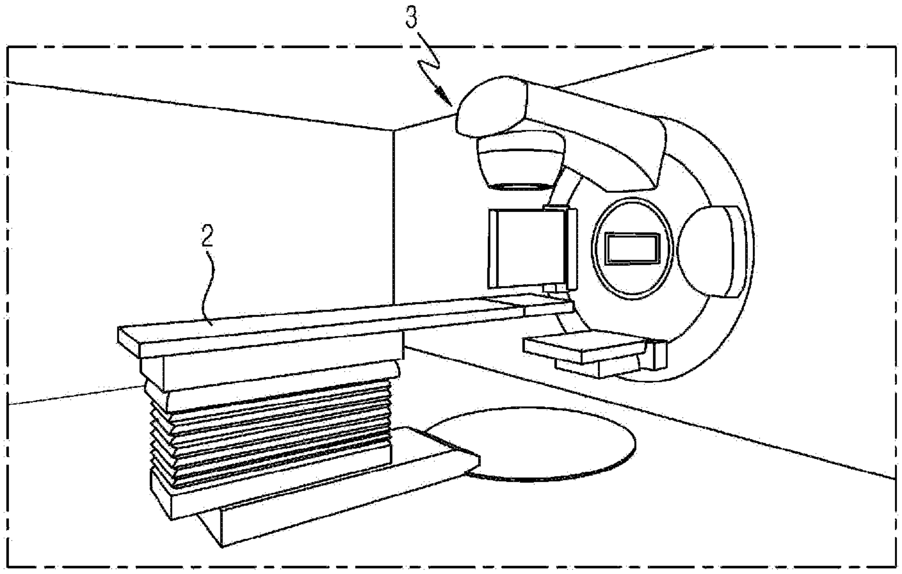
FIG. 13 is a view showing a radiation therapy apparatus and a couch.

As shown in FIG. 13, during radioactive therapy, a patient lies down on a couch 2, and radiation emitted by a radiation therapy apparatus 3 is applied to a lesion site of the patient.

Figure 1:
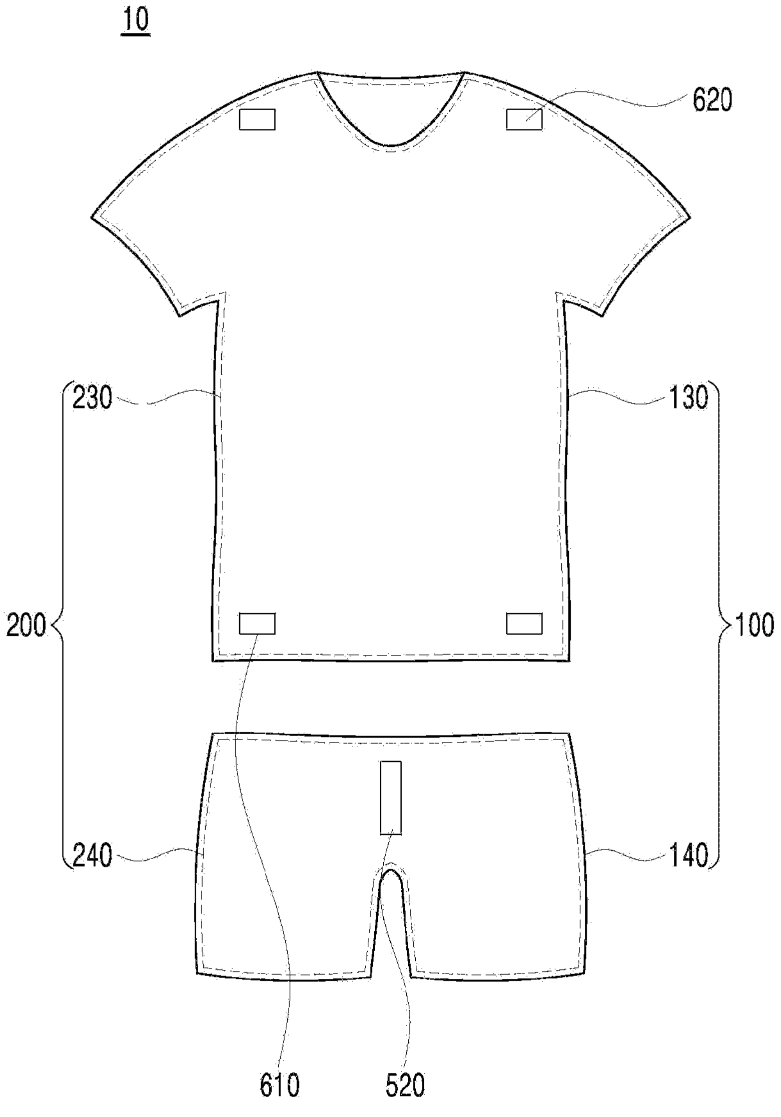
FIG. 1 is a front view of scattered ray-shielding underwear for radiation therapy according to one embodiment of the present invention.

Referring to FIG. 1, scattered ray-shielding underwear 10 for radiation therapy according to the preset invention includes outer underwear 100 formed of a first shielding material, and inner underwear 200 formed of a second shielding material. The first shielding material has a higher atomic number than the second shielding material.

Because there is generally a linear relationship between radiation shield and density and thus radiation shielding performance improves as density increases, a material having a higher density than the second shielding material may be used as the first shielding material.

The scattered ray-shielding underwear 10 for radiation therapy may be used for men and women, and may be manufactured in various types as needed.

The scattered ray-shielding underwear 10 for radiation therapy has flexibility, and may be deformed depending on the site of the patient to be treated.

In the scattered ray-shielding underwear 10 for radiation therapy, the outer underwear 100 may shield scattered rays generated due to high-energy radiation during radiation therapy and the inner underwear 200 may shield braking radiation, and thus, the scattered ray-shielding underwear 10 for radiation therapy may almost completely prevent exposure of the patient to scattered rays and braking radiation.

The scattered ray-shielding underwear 10 for radiation therapy may surround the patient's body so as to protect reproductive organs having a high radiation sensitivity, or main organs of the body, such as the heart, lungs, liver, pancreas, stomach, kidneys, muscles, skin, bone marrow, etc.

The scattered ray-shielding underwear 10 for radiation therapy has an increased thickness at parts thereof located on reproductive organs having a high radiation sensitivity, or main organs of the body, such as the heart, lungs, liver, pancreas, stomach, kidneys, muscle, skin, bone marrow, etc., thereby being capable of increasing a protective effect.

Figure 2:
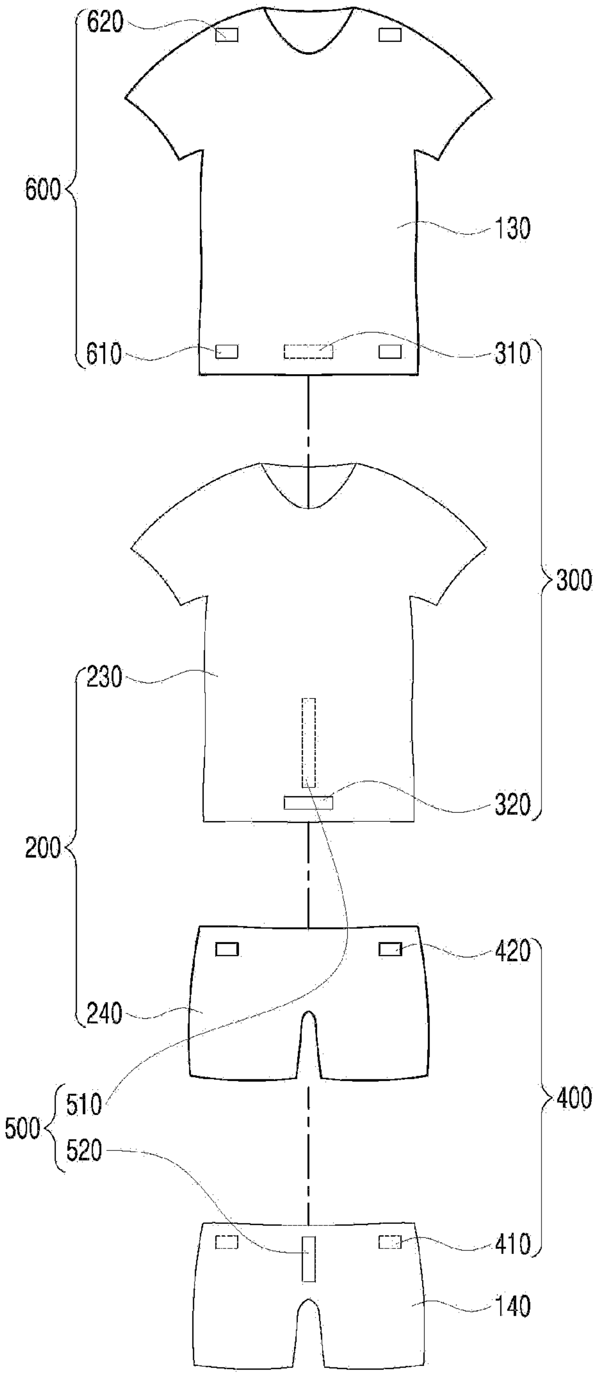
FIG. 2 is a front exploded view of the scattered ray-shielding underwear of FIG. 1.

Referring to FIGS. 1 and 2, the outer underwear 100 is an element configured to shield scattered rays generated due to high-energy radiation during radiation therapy.

The outer underwear 100 may be formed of the first shielding material which may shield scattered rays generated due to high-energy radiation during radiation therapy.

The first shielding material may be formed of a substance having a higher atomic number than the second shielding material.

The first shielding material may be a material selected from a first group consisting of elements having high atomic numbers, including lead (82Pb), tungsten (74W), bismuth (83Bi), barium (56Ba), cadmium (48Cd), and tin (50Sn), bismuth alloys (bismuth, cadmium, tin, lead, and indium), and combinations thereof.

Figure 3:
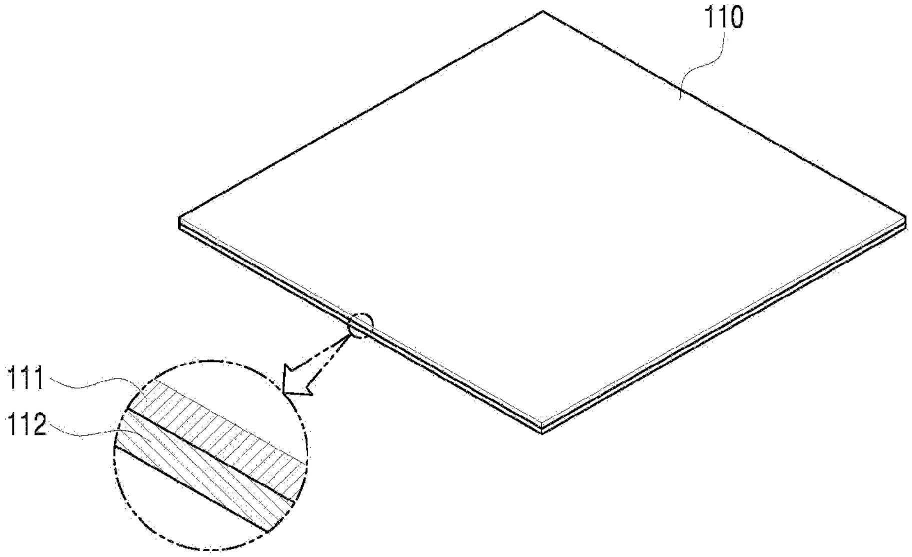
FIG. 3 is a perspective view of a first film fabric to manufacture outer underwear of the scattered ray-shielding underwear shown in FIG. 1.

Referring to FIG. 3, the outer underwear 100 may be obtained by cutting a first film fabric 110.

The first film fabric 110 may be formed by stacking a plurality of films 111 and 112 formed of materials selected from the first group.

Each of the materials selected from the first group may form one of the films 111 and 112.

The first film fabric 110 may be formed by stacking several sheets of the films 111 and 112 formed of the materials selected from the first group.

The first film fabric 110 may be formed by stacking several sheets of the films 111 and 112 formed of the same material selected from the first group, or may be formed by stacking several sheets of the films 111 and 112 formed of different materials selected from the first group.

When the first film fabric 110 is formed by stacking several sheets of the films 111 and 112 formed of the same material or different materials, each of the films 111 and 112 may be formed by stacking several sheets of the same films 111 or 112.

When the first film fabric 110 is formed by stacking several sheets of the films 111 and 112 formed of the same material or different materials, durability of the first film fabric 110 may be improved.

When the first film fabric 110 is formed by stacking several sheets of the films 111 and 112 formed of different materials, effects of shielding scattered rays by all the materials forming the respective films 111 and 112 may be obtained.

The first film fabric 110 is formed by stacking the plurality of thin films 111 and 112, thus being capable of having flexibility.

Figure 4:
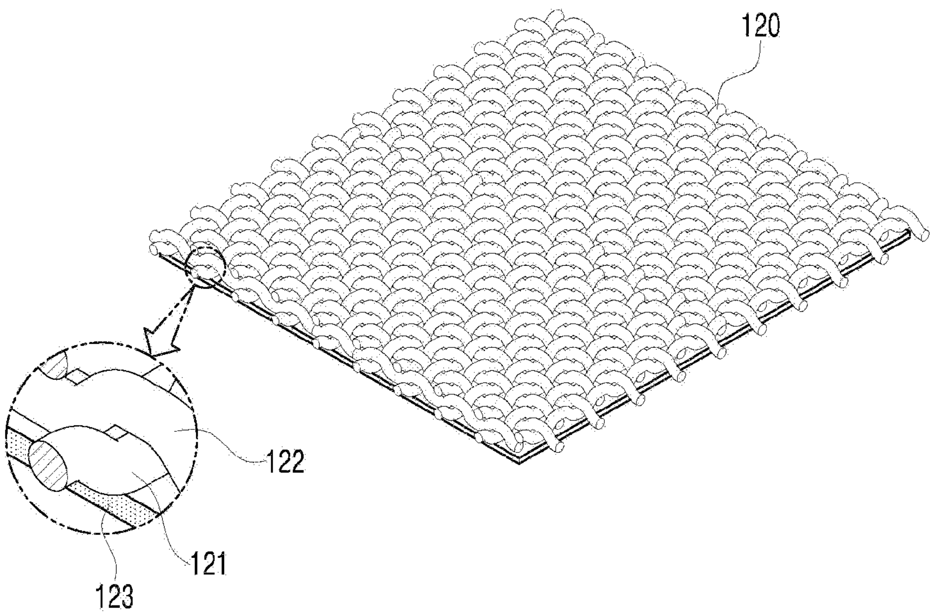
FIG. 4 is a perspective view of a first woven fabric to manufacture the outer underwear of the scattered ray-shielding underwear shown in FIG. 1.

Referring to FIG. 4, the outer underwear 100 may be obtained by cutting a first woven fabric 120.

The first woven fabric 120 may be made by weaving yarns formed of materials selected from the first group.

The first woven fabric 120 may be formed by weaving a first yarn 121 and a second yarn 122.

Each of the materials selected from the first group may form one yarn.

One strand of yarn or plural strands of yarns may form a yarn used to weave the first woven fabric 120.

The first woven fabric 120 may be formed by weaving the yarns formed of the same material selected from the first group, or may be formed by weaving the yarns formed of different materials selected from the first group.

The yarn used to weave the first woven fabric 120 is formed by twisting several strands of yarns formed of the same material selected from the first group, or may be formed by several strands of yarns formed of different materials selected from the first group.

The first woven fabric 120 may be formed by weaving the yarns formed of the same material, or may be formed by weaving the yarns formed of different materials.

When the first woven fabric 120 is formed by weaving the yarns formed by twisting several strands of the yarns formed of the same material or different materials, durability of the first woven fabric 120 may be improved.

When the first woven fabric 120 is formed by weaving the yarns formed of different materials, effects of shielding scattered rays by all the materials forming the respective yarns may be obtained.

The first woven fabric 120 is formed by weaving thin yarns, and may thus have flexibility.

A first coating layer 123 may be formed on one surface or both surfaces of the first woven fabric 120.

The first coating layer 123 is an element configured to shield scattered rays passing through spaces between the yarns forming the first woven fabric 120.

The first coating layer 123 may be formed to cover the entirety of one surface or both surfaces of the first woven fabric 120.

The first coating layer 123 may close the spaces between the yarns forming the first woven fabric 120.

The first coating layer 123 may be formed of a material different from the materials of the yarns forming the first woven fabric 120.

The first coating layer 123 may be formed by stacking a plurality of coating layers formed of the same material or different materials.

When first coating layers 123 are respectively formed on both surfaces of the first woven fabric 120, the first coating layers 123 formed on the two surfaces of the first woven fabric 120 may be formed of different materials.

When the first coating layer 123 is formed of a material different from the materials of the yarns forming the first woven fabric 120, effects of shielding scattered rays by all the respective materials may be obtained.

Referring to FIGS. 1 and 2, the inner underwear 200 is an element configured to shield braking radiation generated due to high-energy radiation during radiation therapy.

The inner underwear 200 is located inside the outer underwear 100, and may be formed to have a smaller size than the outer underwear 100.

The inner underwear 200 may be formed of the second shielding material which may shield braking radiation generated due to high-energy radiation during radiation therapy.

The second shielding material may be formed of a substance having a smaller atomic number than the first shielding material.

The second shielding material may be a material selected from a second group consisting of elements having low atomic numbers, including beryllium (4Be), aluminum (13Al), copper (29Cu), and zinc (30Zn), water, paraffin, plastics including polyethylene, and combinations thereof.

As disclosed in Korean Patent Registration No. 1967664 and Japanese Patent Laid-open Publication No. 2015-225062, shields including elements having high atomic numbers and elements having low atomic numbers are known, and a method of manufacturing the same will thus be omitted.

Figure 5:
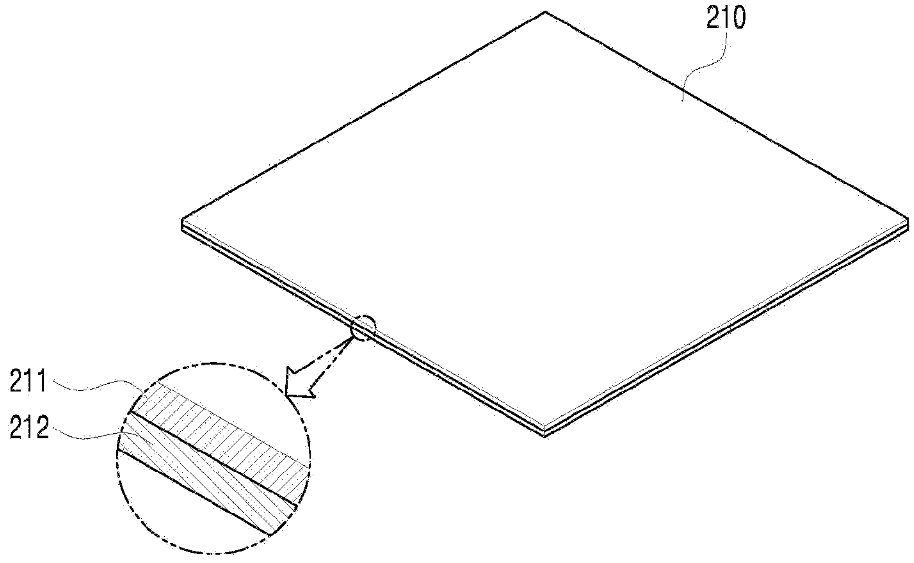
FIG. 5 is a perspective view of a second film fabric to manufacture inner underwear of the scattered ray-shielding underwear shown in FIG. 1.

Referring to FIG. 5, the inner underwear 200 may be obtained by cutting a second film fabric 210.

The second film fabric 210 may be formed by stacking a plurality of films 211 and 212 formed of materials selected from the second group.

Each of the materials selected from the second group may form one of the films 211 and 212.

The second film fabric 210 may be formed by stacking several sheets of the films 211 and 212 formed of the materials selected from the second group.

The second film fabric 210 may be formed by stacking several sheets of the films 211 and 212 formed of the same material selected from the second group, or may be formed by stacking several sheets of the films 211 and 212 formed of different materials selected from the second group.

When the second film fabric 210 is formed by stacking several sheets of the films 211 and 212 formed of different materials, each of the films 211 and 212 may be formed by stacking several sheets of the same films 211 or 212.

When the second film fabric 210 is formed by stacking several sheets of the films 211 and 212 formed of the same material or different materials, durability of the second film fabric 210 may be improved.

When the second film fabric 210 is formed by stacking several sheets of the films 211 and 212 formed of different materials, effects of shielding scattered rays by all the materials forming the respective films 211 and 212 may be obtained.

The second film fabric 210 is formed by stacking the plurality of thin films 211 and 212, thus being capable of having flexibility.

Figure 6:
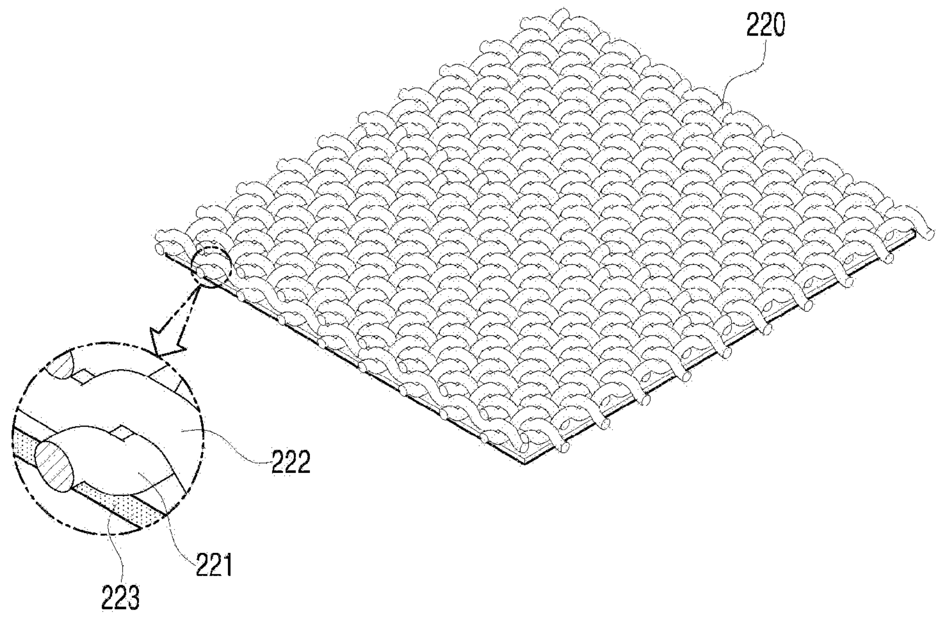
FIG. 6 is a perspective view of a second woven fabric to manufacture the inner underwear of the scattered ray-shielding underwear shown in FIG. 1.

Referring to FIG. 6, the inner underwear 200 may be obtained by cutting a second woven fabric 220.

The inner underwear 200 may be replaced after use by a patient.

The second woven fabric 220 may be made by weaving yarns formed of materials selected from the second group.

The second woven fabric 220 may be formed by weaving a third yarn 221 and a fourth yarn 222.

Each of the materials selected from the second group may form one yarn.

One strand of yarn or plural strands of yarns may form a yarn used to weave the second woven fabric 220.

The second first woven fabric 220 may be formed by weaving yarns formed of the same material selected from the second group, or may be formed by weaving yarns formed of different materials selected from the second group.

The yarn used to weave the second woven fabric 220 is formed by twisting several strands of yarns formed of the same material selected from the second group, or may be formed by several strands of yarns formed of different materials selected from the second group.

The second woven fabric 220 may be formed by weaving the yarns formed of the same material, or may be formed by weaving the yarns formed of different materials.

When the second woven fabric 220 is formed by weaving the yarns formed by twisting several strands of yarns formed of the same material or different materials, durability of the second woven fabric 220 may be improved.

When the second woven fabric 220 is formed by weaving the yarns formed of different materials, effects of shielding scattered rays by all the materials forming the respective yarns may be obtained.

The second woven fabric 220 is formed by weaving thin yarns, and may thus have flexibility.

A second coating layer 123 may be formed on one surface or both surfaces of the second woven fabric 220.

The second coating layer 123 is an element configured to shield scattered rays passing through spaces between the yarns forming the second woven fabric 220.

The second coating layer 123 may be formed to cover the entirety of one surface or both surfaces of the second woven fabric 220.

The second coating layer 123 may close the spaces between the yarns forming the second woven fabric 220.

The second coating layer 123 may be formed of a material different rom the materials of the yarns forming the second woven fabric 220.

The second coating layer 123 may be formed by stacking a plurality of coating layers formed of the same material or different materials.

When second coating layers 123 are respectively formed on both surfaces of the second woven fabric 220, the second coating layers 123 formed on the two surfaces of the second woven fabric 220 may be formed of different materials.

When the second coating layer 123 is formed of a material different from the materials of the yarns forming the second woven fabric 120, effects of shielding scattered rays by all the respective materials may be obtained.

Referring to FIG. 2, the outer underwear 100 may include an outer top 130 and an outer bottom 140, and the inner underwear 200 may include an inner top 230 and an inner bottom 240.

The outer top 130 and the inner top 230 may be provided in various forms, such as a T-shirt, a sleeveless shirt, and a tank top.

The outer bottom 140 and the inner bottom 240 may be provided in various form, such as briefs and boxers.

When each of the outer underwear 100 and the inner underwear 200 includes a top and a bottom, a patient may select and wear only a necessary element, or may select and wear all elements.

When each of the outer underwear 100 and the inner underwear 200 includes a top and a bottom, the patient may wear and take off the scattered ray-shielding underwear.

When the outer underwear 100 includes the outer top 130 and the outer bottom 140, a person in charge may wash or replace only a damaged element of the scattered ray-shielding underwear, and thus, the scattered ray-shielding underwear may be conveniently managed and maintenance costs thereof may be reduced.

Referring to FIG. 2, the scattered ray-shielding underwear may further include first coupling members 300 and second coupling members 400 configured to maintain an overlapping state between the outer underwear 100 and the inner underwear 200.

When each of the outer underwear 100 and the inner underwear 200 includes a top and a bottom, the scattered ray-shielding underwear may further include the first coupling members 300 configured to maintain an overlapping state between the outer top and the inner top and the second coupling members 400 configured to maintain an overlapping state between the outer bottom and the inner bottom.

The first coupling members 300 and the second coupling members 400 may be formed of an air equivalent material.

Air equivalent materials indicate materials having the same effective atomic number as air and exhibiting the same ionization with respect to radiation as air. Air equivalent materials include graphite, paper, specific plastics, etc.

When the first coupling members 300 and the second coupling members 400 are formed of the air equivalent material, the first coupling members 300 and the second coupling members 400 exhibit the same ionization with respect to radiation as air, and may have little influence on scattered rays.

The first coupling members 300 are coupled between the outer top 130 and the inner top 230 so as to maintain the overlapping state between the outer top 130 and the inner top 230.

One or more first coupling members 300 may be provided, and may be disposed in a distributed manner between the outer top 130 and the inner top 230.

The first coupling members 300 may be one or more buttons or Velcro strips coupled to the outer top 130 and the inner top 230.

The Velcro strips used as the first coupling members 300 may include a first Velcro strip 310 coupled to the inner surface of the outer top 130, and a second Velcro strip 320 coupled to the outer surface of the inner top 230.

The second coupling members 400 are coupled between the outer bottom 140 and the inner bottom 240 so as to maintain the overlapping state between the outer bottom 140 and the inner bottom 240.

One or more second coupling members 400 may be provided, and may be disposed in a distributed manner between the outer bottom 140 and the inner bottom 240.

The second coupling members 400 may be one or more buttons or Velcro strips coupled to the outer bottom 140 and the inner bottom 240.

The Velcro strips used as the second coupling members 400 may include a third Velcro strip 410 coupled to the inner surface of the outer bottom 140, and a fourth Velcro strip 420 coupled to the outer surface of the inner bottom 240.

Referring to FIG. 2, when each of the outer underwear 100 and the inner underwear 200 includes a top and a bottom, the scattered ray-shielding underwear may include third coupling members 500 configured to maintain an overlapping state between the top and the bottom.

The third coupling members 500 may be formed of an air equivalent material.

When the third coupling members 500 are formed of the air equivalent material, the third coupling members 500 exhibit the same ionization with respect to radiation as air, and may have little influence on scattered rays.

When the top and the bottom of each of the outer underwear and the inner underwear are not coupled during radiation therapy of the patient's head or the like, a part of the patient's body exposed between the top and the bottom may not shield scattered rays and braking radiation, and thus, the third coupling members 500 are elements configured to solve such a problem.

The third coupling members 500 may be coupled between the outer top 130 or the inner top 230 and the outer bottom 140 or the inner bottom 240 so as to maintain the coupled state between the outer top 130 or the inner top 230 and the outer bottom 140 or the inner bottom 240.

A plurality of third coupling members 500 may be provided, and may be disposed in a distributed manner between the outer top 130 or the inner top 230 and the outer bottom 140 or the inner bottom 240.

The third coupling members 500 may be a plurality of buttons, zippers or Velcro strips coupled to the top and the bottom.

The zippers used as the third coupling members 500 may be coupled between the lower end of the top and the upper end of the bottom.

When the top covers the bottom, the Velcro strips used as the third coupling members 500 may include a fifth Velcro strip 510 coupled to the inner surface of the inner top 230 and a sixth Velcro strip 520 coupled to the outer surface of the outer bottom 140.

When the bottom covers the top, the Velcro strips used as the third coupling members 500 may include a fifth Velcro strip 510 coupled to the outer surface of the outer top 230 and a sixth Velcro strip 520 coupled to the inner surface of the inner bottom 240.

The third coupling members 500 may be Velcro strips configured to extend in the vertical direction so as to adjust a height of a coupling area therebetween.

When the fifth Velcro strip 510 and the sixth Velcro strip 520 are formed to extend in the vertical direction, a height of a coupling area between the fifth Velcro strip 510 and the sixth Velcro strip 520 may be adjusted depending on the size of the patient's body.

Referring to FIGS. 8A to 11, when each of the outer underwear 100 and the inner underwear 200 includes a top and a bottom, the scattered ray-shielding underwear may include fourth coupling members 600 configured to fold up the lower part of the top so as to maintain an overlapping state thereof with the upper part of the top.

The fourth coupling members 600 are elements configured to couple the lower part and the upper part of the outer top 130.

When the outer underwear 100 is folded up, the inner underwear 200 coupled thereto by the third coupling members 500 may be folded up together.

The fourth coupling members 600 may be formed of an air equivalent material.

When the fourth coupling members 600 are formed of the air equivalent material, the fourth coupling members 600 exhibit the same ionization with respect to radiation as air, and may have little influence on scattered rays.

The fourth coupling members 600 may expose only a part of the patient's body which needs to be treated.

The fourth coupling members 600 may maintain the folded state of the lower part of the top so as to prevent the folded lower part of the top from being unfolded and covering the patient's abdomen during radiation therapy of the patient's abdomen.

The fourth coupling members 600 may include one or more buttons or Velcro strips coupled to the lower and upper parts of the outer top 130.

The Velcro strips used as the fourth coupling members 600 may include a seventh Velcro strip 610 coupled to the lower part of the outer surface of the outer top 130 and an eighth Velcro strip 620 coupled to the upper part of the outer surface of the outer top 130.

The seventh Velcro strip 610 and the eighth Velcro strip 620 may be coupled to the front or rear surface of the outer top 130.

The seventh Velcro strip 610 and the eighth Velcro strip 620 may be coupled to both the front and rear surfaces of the outer top 130.

A plurality of seventh Velcro strips 610 used as the fourth coupling members 600 may be provided to be spaced apart from one another in the vertical direction.

When one is selected from among the plurality of seventh Velcro strips 610 and is coupled to the eighth Velcro strip 620, the folded height of the top may be adjusted.

A plurality of eighth Velcro strips 620 used as the fourth coupling members 600 may be provided to be spaced apart from one another in the vertical direction.

When one is selected from among the plurality of eighth Velcro strips 620 and is coupled to the seventh Velcro strip 610, the folded height of the top may be adjusted.

A plurality of seventh Velcro strips 610 and a plurality of eighth Velcro strips 620 used as the fourth coupling members 600 may be provided to be spaced apart from one another in the vertical direction.

When one is selected from among the plurality of seventh Velcro strips 610 and is coupled to one selected from among the eighth Velcro strip 620, the folded height of the top may be adjusted.

The fourth coupling members 600 may be Velcro strips configured to extend in the vertical direction so as to adjust the height of a coupling area therebetween.

When the seventh Velcro strip 610 and the eighth Velcro strip 620 are configured to extend in the vertical direction, the height of the coupling area between the seventh Velcro strip 610 and the eighth Velcro strip 620 may be adjusted depending on a part of the patient's body which needs to be treated.

Figure 7A:
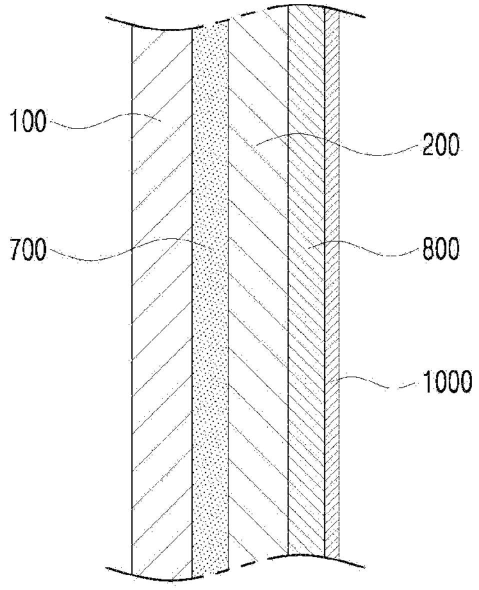
FIG. 7A and FIG. 7B shows partial cross-sectional views illustrating a state in which disposable underwear and intermediate underwear are added to the scattered ray-shielding underwear shown in FIG. 1.
Figure 7B:
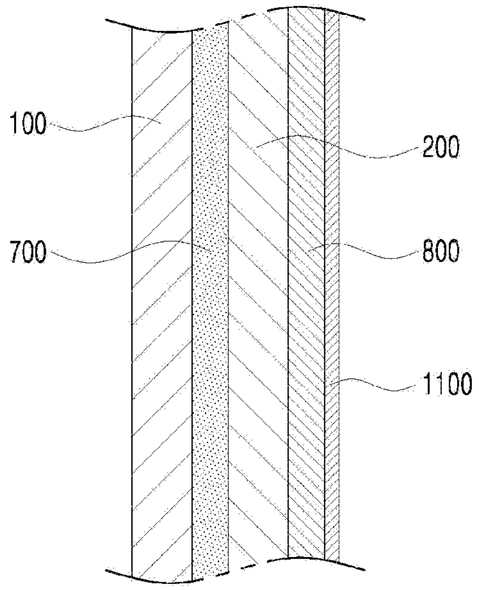
Figure 8A:
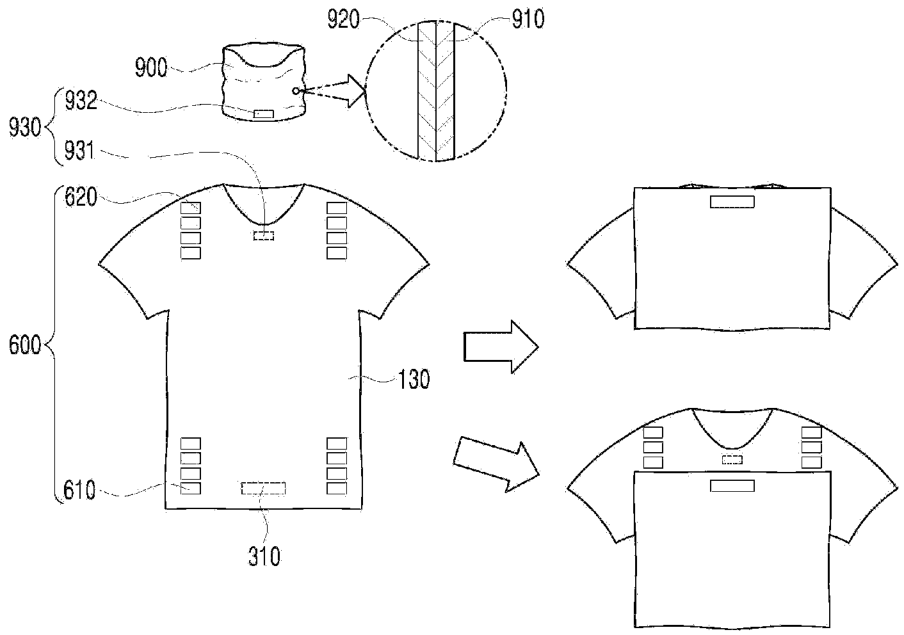
FIG. 8A and FIG. 8B shows front and rear views illustrating one embodiment of fourth coupling members configured to fold up and fix the outer underwear, and a neck band of the scattered ray-shielding underwear shown in FIG. 2.
Figure 8B:
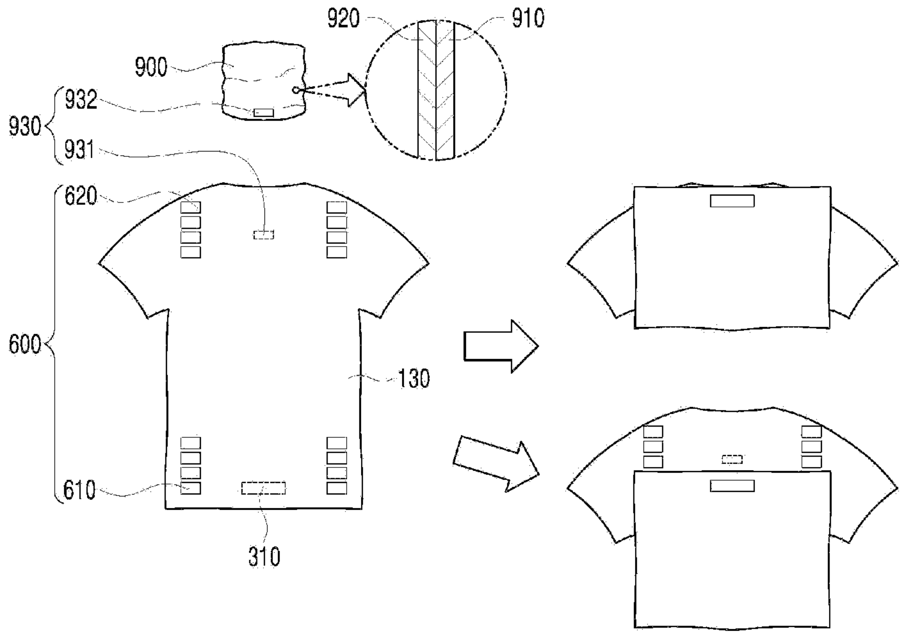
Figure 9A:
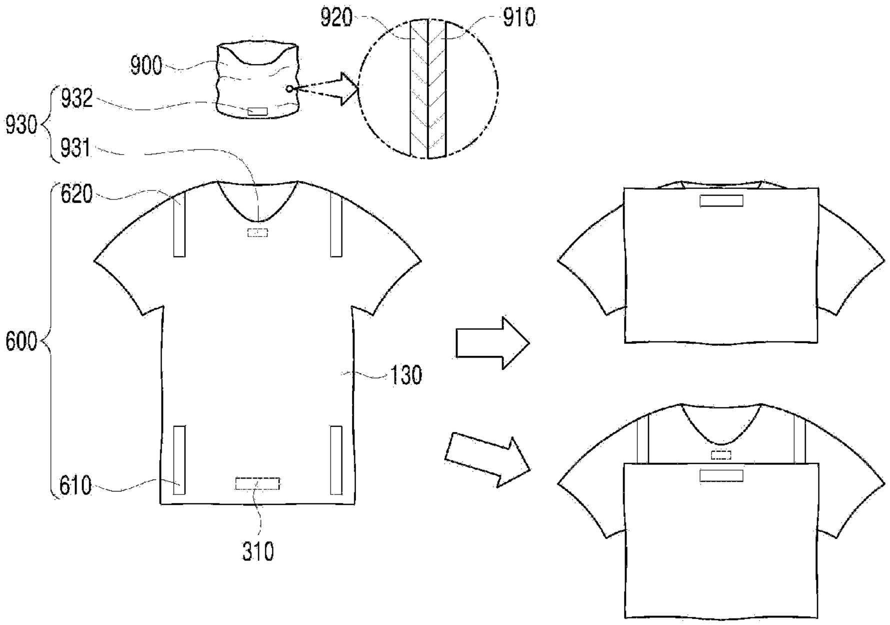
FIG. 9A and FIG. 9B shows front and rear views illustrating another embodiment of the fourth coupling members configured to fold up and fix the outer underwear, and the neck band of the scattered ray-shielding underwear shown in FIG. 2.
Figure 9B:
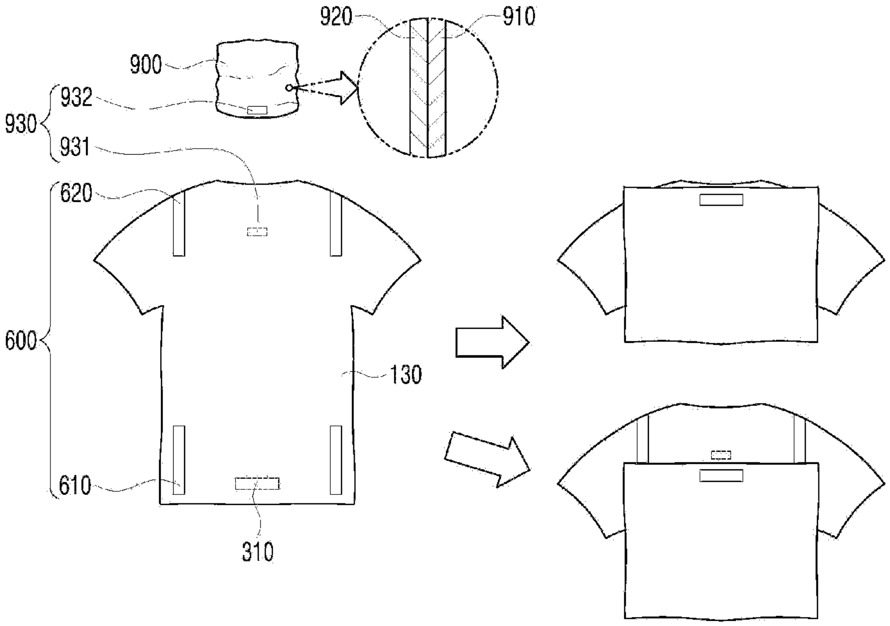
Figure 10:
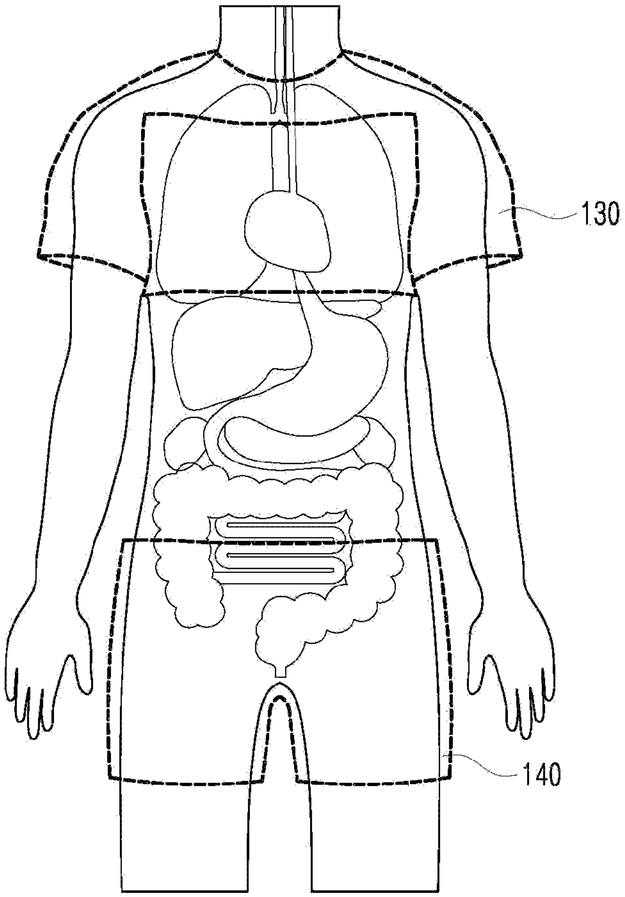
FIG. 10 is a view showing shielded parts and exposed parts of the body of a patient when the outer underwear of the scattered ray-shielding underwear shown in FIGS. 8A through 9B is folded up and fixed.
Figure 11:
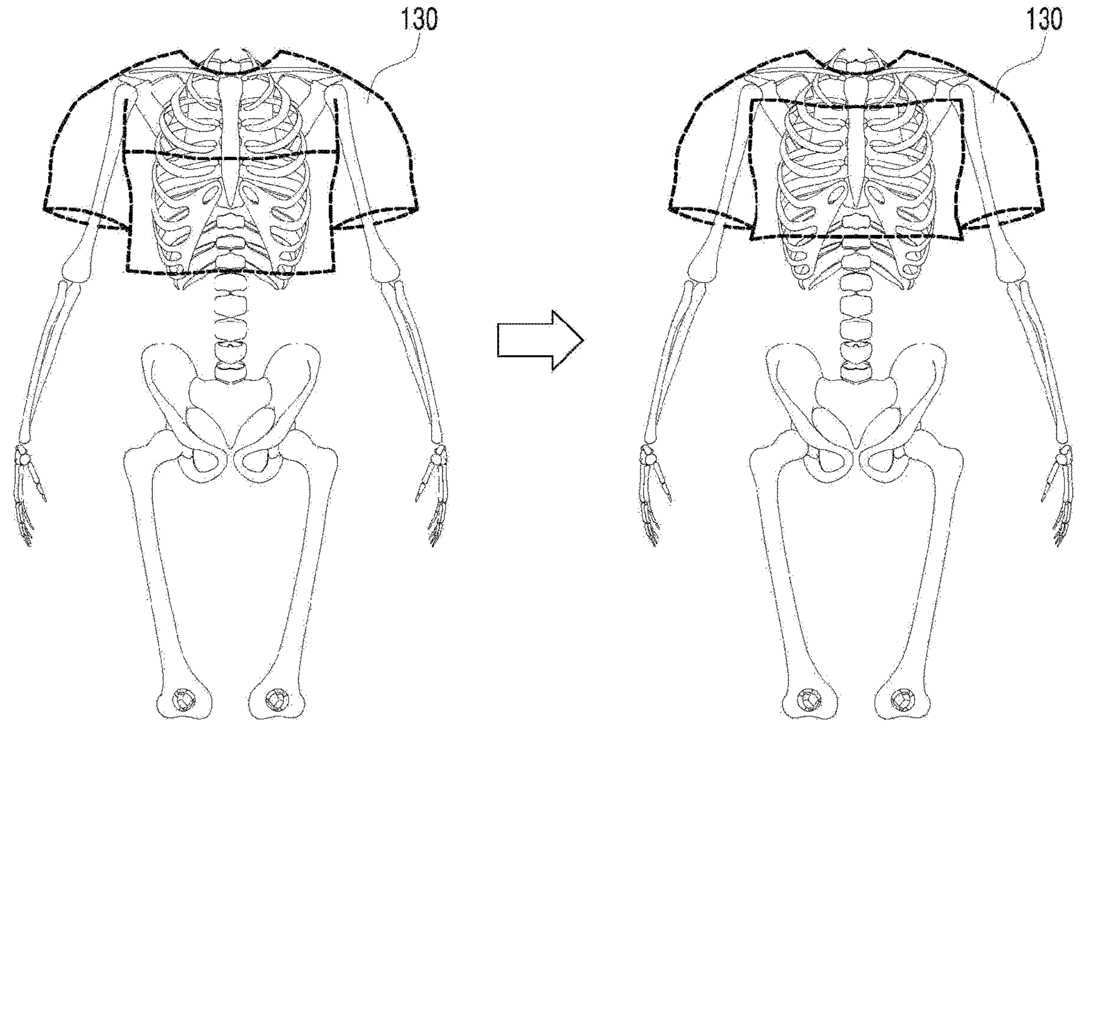
FIG. 11 is a view showing shielded parts and exposed parts of the skeleton of a patient when the outer underwear of the scattered ray-shielding underwear shown in FIGS. 8A through 9B is folded up and fixed.
Figure 12:
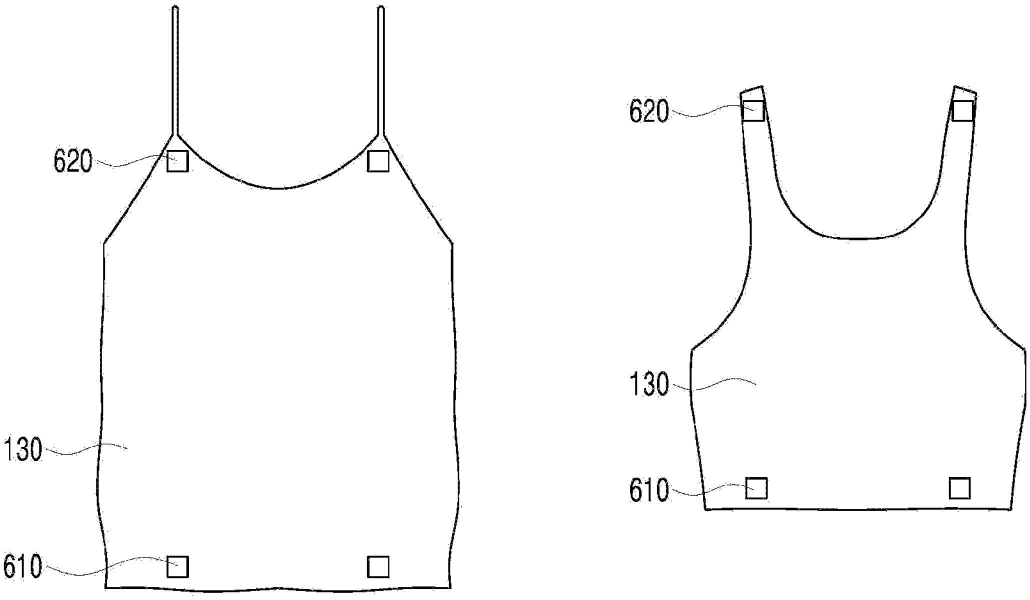
FIG. 12 is a view showing various types of the outer underwear of the scattered ray-shielding underwear shown in FIG. 1.

Referring to FIGS. 7A and 7B, the scattered ray-shielding underwear 10 for radiation therapy may further include intermediate underwear 700 located between the outer underwear 100 and the inner underwear 200.

The intermediate underwear 700 may shield scattered rays generated from the outer underwear 100 or the inner underwear 200.

The outer underwear 100, the inner underwear 200 and the intermediate underwear 700 may be formed of different materials.

The intermediate underwear 700 may be formed of the first shielding material or the second shielding material depending on properties of the scattered rays generated from the outer underwear 100.

The intermediate underwear 700 may space the outer underwear 100 and the inner underwear 200 apart from each other, and may maintain a regular distance therebetween.

The intermediate underwear 700 may include an intermediate top and an intermediate bottom.

Referring to FIGS. 7A and 7B, the scattered ray-shielding underwear 10 for radiation therapy may further include additional underwear 800 attached to and detached from the inner surface of the inner underwear 200.

The additional underwear 800 may shield scattered rays generated from the outer underwear 100 or the inner underwear 200.

The outer underwear 100, the inner underwear 200, the intermediate underwear 700 and the additional underwear 800 may be formed of different materials.

The additional underwear 800 may be formed of the first shielding material or the second shielding material depending on properties of the scattered rays generated from the outer underwear 100 or the inner underwear 200.

The additional underwear 800 may space the patient's body and the inner underwear 200 from each other, may maintain a regular distance therebetween, and may come into direct contact with the patient's body.

The additional underwear 800 may include an additional top and an additional bottom.

Referring to FIGS. 7A and 7B, the scattered ray-shielding underwear 10 for radiation therapy may further include wearing underwear 1000 attached to and detached from the inner surface of the inner underwear 200.

When the additional underwear 800 is worn by the patient, the wearing underwear 1000 may be attached to and detached from the inner surface of the additional underwear 800.

The wearing underwear 1000 may block cold air or prevent inconvenience felt by the patient when the patient's body comes into direct contact with the inner underwear 200 or the additional underwear 800.

The wearing underwear 1000 may be formed of a material, such as a fabric made of natural fiber or a fabric made of synthetic fiber, which may improve patient's comfort of wearing.

Referring to FIGS. 7A and 7B, the scattered ray-shielding underwear 10 for radiation therapy may further include disposable underwear 1100 attached to and detached from the inner surface of the inner underwear 200.

When the additional underwear 800 is worn by the patient, the disposable underwear 1100 may be attached to and detached from the inner surface of the additional underwear 800.

In the case that several patients use the scattered ray-shielding underwear 10 for radiation therapy, when the disposable underwear 1100 is used, the disposable underwear 1100 coming into direct contact with a patient's skin may be replaced, thus being capable of increasing sanitation.

The disposable underwear 1100 may formed of an air equivalent material.

When the disposable underwear 1100 is formed of the air equivalent material, the disposable underwear 1100 exhibits the same ionization with respect to radiation as air, and may have little influence on scattered rays.

Referring to FIGS. 8A through 9B, the scattered ray-shielding underwear 10 for radiation therapy may further include a neck band 900.

The neck band 900 is an element configured to surround the neck so as to protect the neck.

The neck band 900 may include an outer band 910 formed of the first shielding material and an inner band 920 formed of the second shielding material.

In the neck bank 900, the outer band 910 formed of the first shielding material may shield scattered rays generated due to high-energy radiation during radiation therapy and the inner band 920 formed of the second shielding material may shield braking radiation, and thus, the neck band 900 may almost completely prevent exposure of the patient's neck to scattered rays and braking radiation.

The neck band 900 may include fifth coupling members 930 configured to couple the lower part of the neck band 900 to the outer underwear 100 or the inner underwear 200.

The fifth coupling members 930 are coupled between the outer top 130 or the inner top 230 and the neck band 900.

A plurality of fifth coupling members 930 may be provided, and disposed in a distributed manner between the outer top 130 or the inner top 230 and the neck band 900.

The fifth coupling members 930 may be one or more buttons, zippers or Velcro strips coupled to the top and the bottom.

The zippers used as the fifth coupling members 930 may be coupled between the lower end of the neck band 900 and the neckline of the outer top 130 or the inner top 230.

The Velcro strips used as the fifth coupling members 930 may include a ninth Velcro strip 931 coupled to the inner surface of the outer top 130 or the inner top 230 and a tenth Velcro strip 932 coupled to the outer surface of the neck band 900.

The ninth Velcro strip 931 may be coupled to the outer surface of the outer top 130 or the inner top 230.

The tenth Velcro strip 932 may be coupled to the inner surface of the neck band 900.

Figure 14:
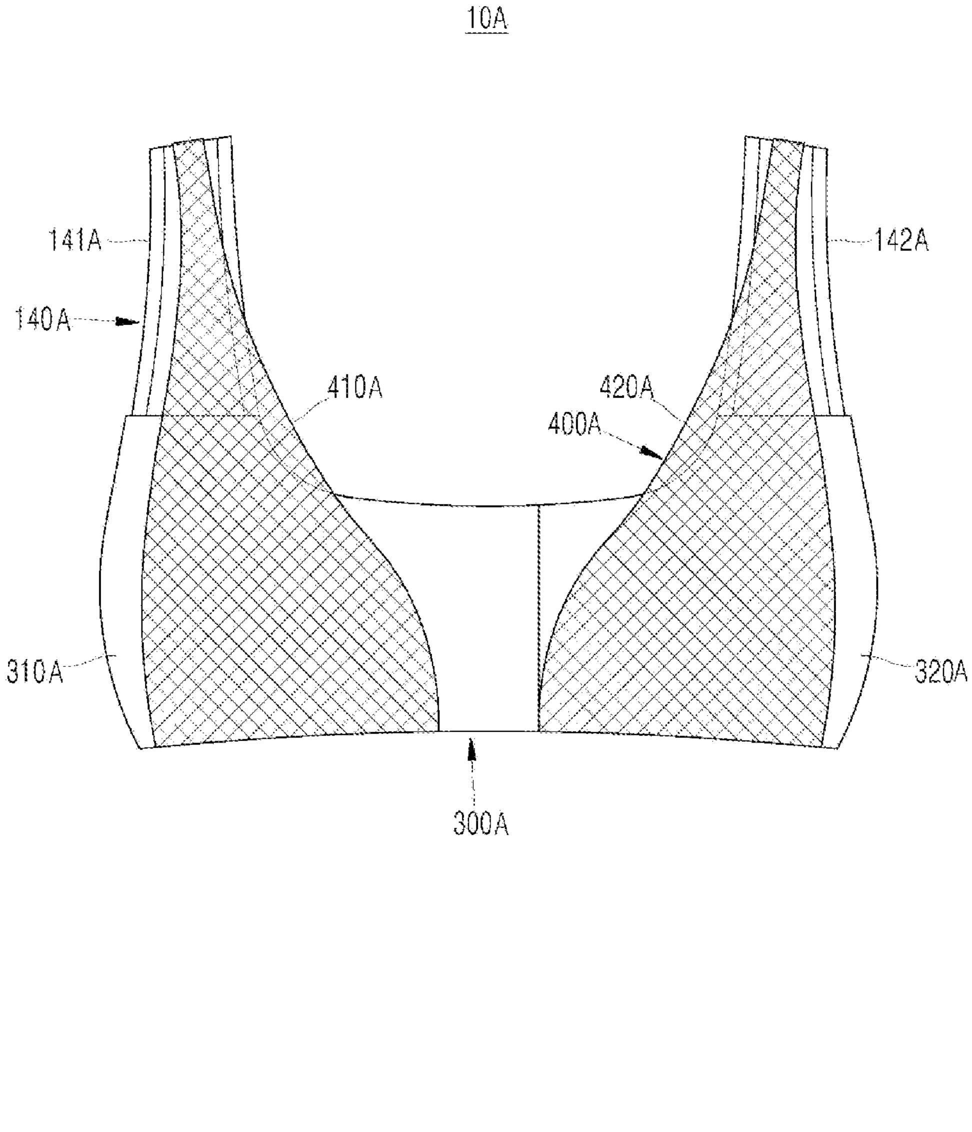
FIG. 14 is a front view of a scattered ray-shielding brassiere, to which a radiation shielding principle for radiation therapy is applied, according to one embodiment of the present invention.
Figure 15:
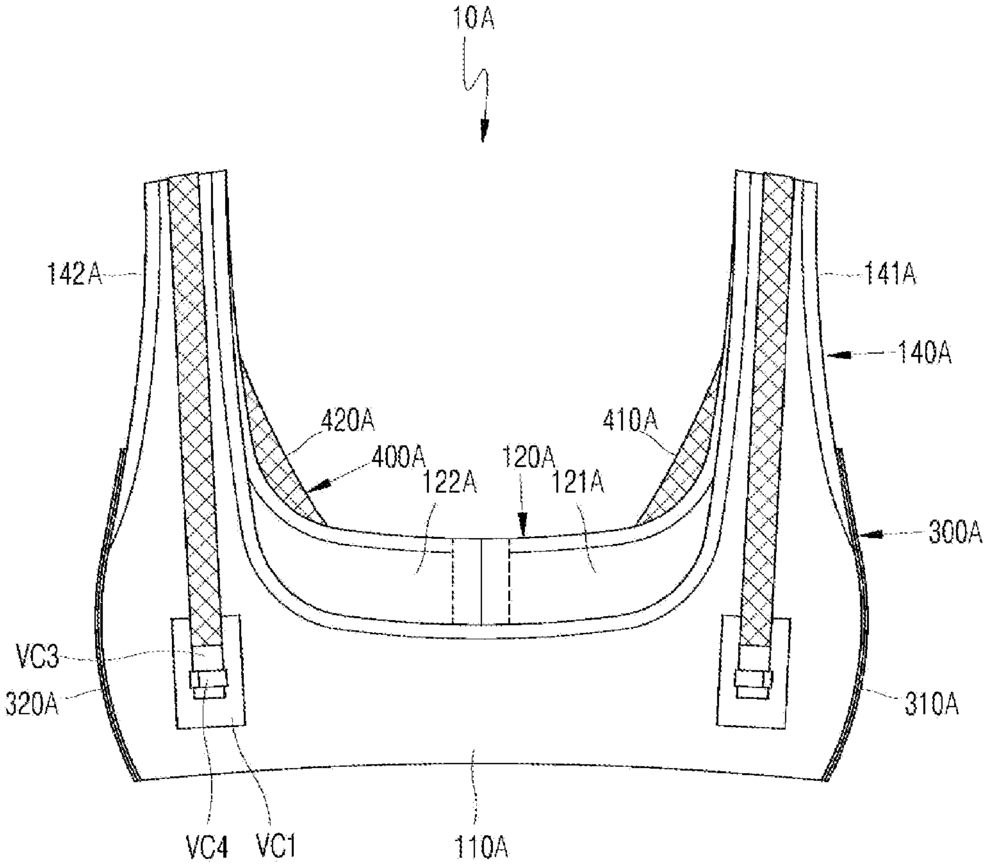
FIG. 15 is a rear view of the scattered ray-shielding brassiere, to which the radiation shielding principle for radiation therapy is applied, shown in FIG. 14.
Figure 16:
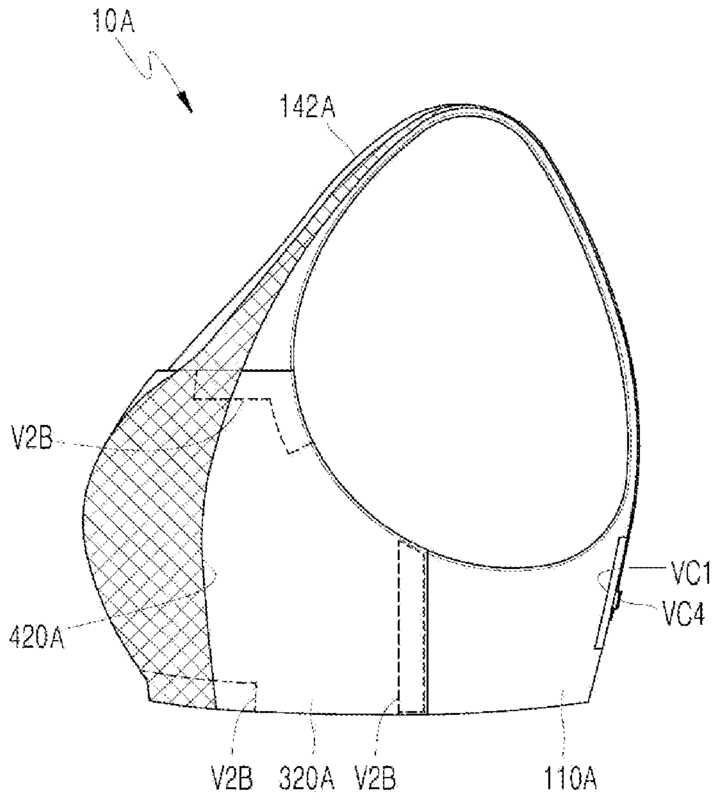
FIG. 16 is a side view of the scattered ray-shielding brassiere, to which the radiation shielding principle for radiation therapy is applied, shown in FIG. 14.

As shown in FIGS. 14 to 16, a scattered ray-shielding brassiere 10A, to which a radiation shielding principle for radiation therapy is applied, according to one embodiment of the present invention is configured to shield patient's breasts from scattered rays during radiation therapy of a part of the patient's body around the breasts and to prevent visual exposure of the patient's breasts, and includes a wearing member 100A, first shields 200A, second shields 300A, and shoulder bands 400A.

Figure 17:
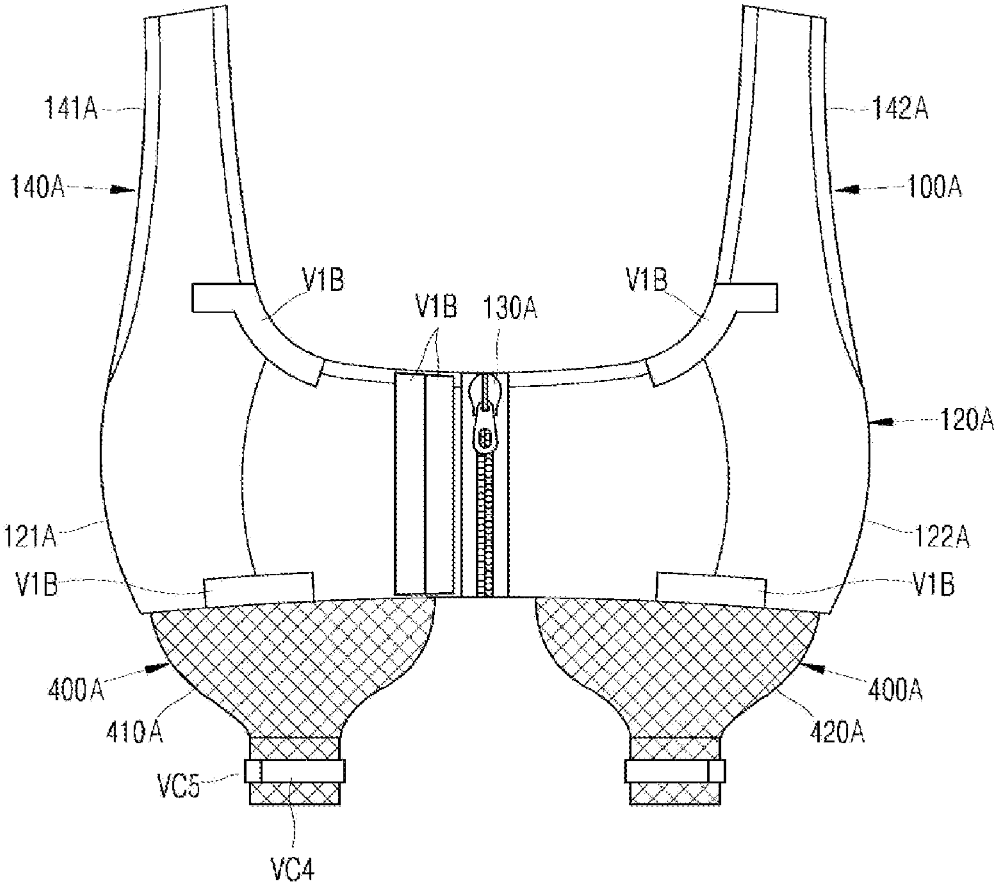
FIG. 17 is a front view showing a state in which first shields and second shields are removed from a wearing member of the scattered ray-shielding brassiere, to which the radiation shielding principle for radiation therapy is applied, shown in FIG. 14.
Figure 18:
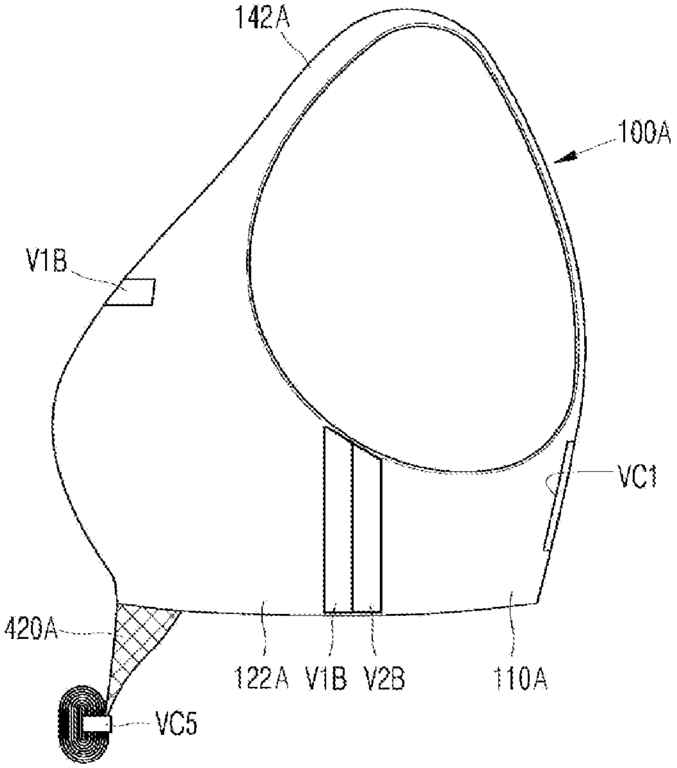
FIG. 18 is a side view of the scattered ray-shielding brassiere, to which the radiation shielding principle for radiation therapy is applied, shown in FIG. 17.

As shown in FIGS. 17 and 18, the wearing member 100A has a form which surrounds the patient's chest and covers both of the patient's breasts. The wearing member 100A may approximately have the form of a sports bra.

The wearing member 100A includes a back part 110A, a front part 120A, a coupling member 130A, and shoulder parts 140A. The back part 110A, the front part 120A, the coupling member 130 and the shoulder parts 140A may take the form of clothing.

The back part 110A, the front part 120A and the shoulder parts 140A may be formed of an air equivalent material. Air equivalent materials indicate materials having the same effective atomic number as air and exhibiting the same ionization with respect to radiation as air. Air equivalent materials include graphite, paper, specific plastics, etc.

The back part 110A covers the patient' back. The back part 110A may expand and contract elastically during a process of wearing the wearing member 100A by the patient, and may be adhered to the patient's back.

The back part 110A may be formed of an air equivalent material. For example, the back part 110A may be formed of woven carbon fiber. When the back part 110A is formed of carbon fiber, the back part 110A exhibits the same ionization with respect to radiation as air, and may have little influence on scattered rays.

As shown in FIG. 17, the front part 120A covers the patient's breasts, and includes a first front part 121A and a second front part 122A.

The first front part covers one of the patient's breasts. The second front part 122A covers the other of the patient breasts. The first front part 121A and the second front part 122A are adhered to the patient's breasts by the overall elastic recovery of the wearing member 100A.

The first front part 121A is connected to the back part 110A at one side of the patient. The second front part 122A is connected to the back part 110*a* at the other side of the patient.

The first front part 121A and the second front part 122A are coupled to each other between the patient's breasts by the coupling member 130A. That is, the coupling member 130A provided between the first front part 121A and the second front part 122A connects the first front part 121A and the second front part 122A.

The coupling member 130A may be provided as a zipper or Velcro strips. FIG. 17 illustrates an embodiment in which the coupling member 130A is provided as a zipper.

The patient may connect the first front part 121A and the second front part 122A through the coupling member 130A after wearing the wearing member 100A provided in the form of a sports bra. When the first front part 121A and the second front part 122A are connected through the coupling member 130A, the front part 120A may be adhered to the patient's breasts while expanding and contracting elastically.

The first front part 121A and the second front part 122A may form a symmetrical structure with respect to the coupling member 130A. The first front part 121A and the second front part 122A may have the same structure except for being symmetrical to each other. Hereinafter, it will be understood that the front part 120A means both the first front part 121A and the second front part 122A.

The front part 120A may be formed of an air equivalent material. For example, the front part 120A may be formed of woven carbon fiber. When the front part 120A is formed of carbon fiber, the front part 120A exhibits the same ionization with respect to radiation as air, and may have little influence on scattered rays.

As shown in FIGS. 15 and 16, the shoulder parts 140A pass over the patient's shoulders, and connects the front part 120A and the back part 110A. The shoulder parts 140A include a first shoulder part 141A and a second shoulder part 142A.

As shown in FIGS. 15 and 17, one end of the first shoulder part 141A may be connected to the upper part of the first front part 121A, and the other end of the first shoulder part 141A may be connected to the back part 110A. Further, one end of the second shoulder part 142A may be connected to the upper part of the second front part 122A, and the other end of the second shoulder part 142A may be connected to the back part 110A.

The shoulder parts 140A, the front part 120A and the back part 110A may be manufactured integrally. Otherwise, the shoulder parts 140A, the front part 120A and the back part 110A may be integrated by sewing, adhesion or heat fusion.

The shoulder parts 140A may be formed of an air equivalent material. For example, the shoulder parts 140A may be formed of woven carbon fiber. When the shoulder parts 140A are formed of carbon fiber, the shoulder parts 140A exhibit the same ionization with respect to radiation as air, and may have little influence on scattered rays.

Figure 20:
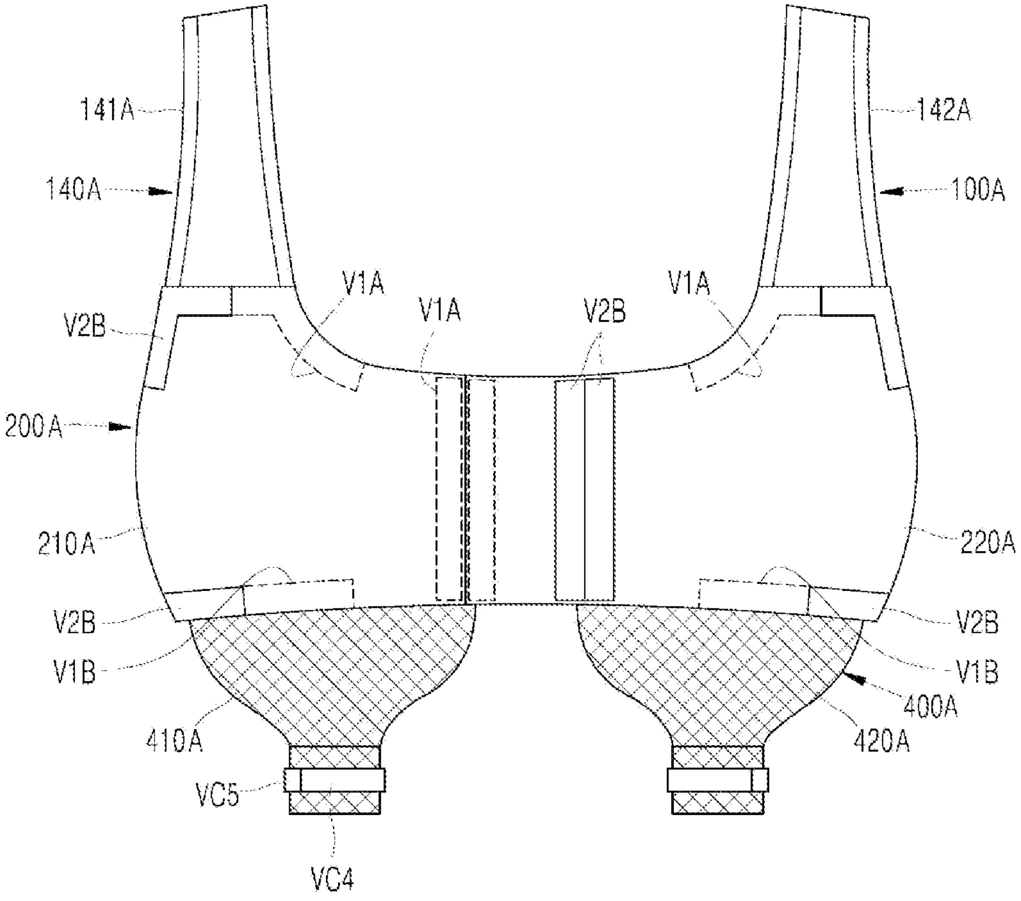
FIG. 20 is a front view showing a state in which the first shields are attached to the wearing member of the scattered ray-shielding brassiere, to which the radiation shielding principle for radiation therapy is applied, shown in FIG. 17.
Figure 21:
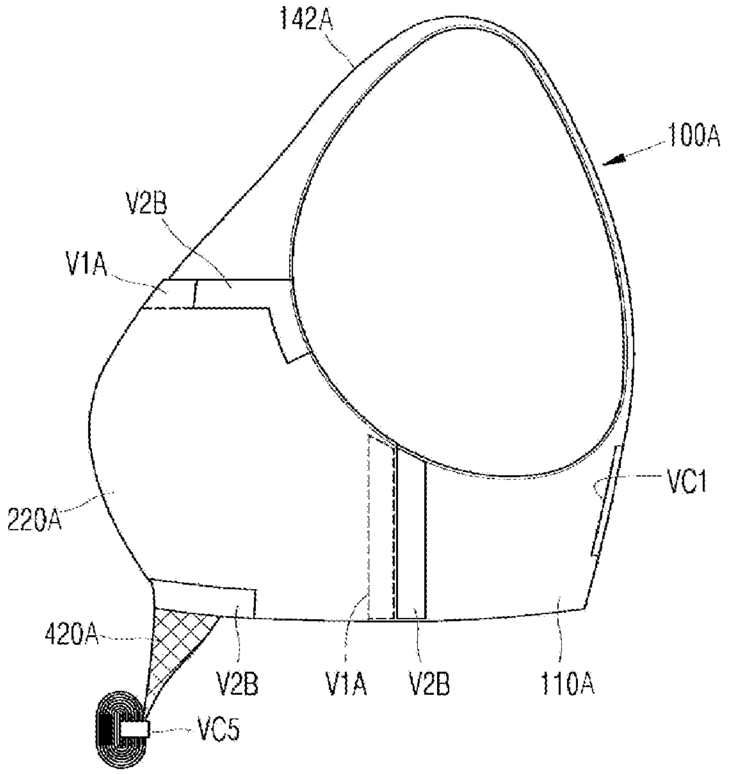
FIG. 21 is a side view of the scattered ray-shielding brassiere, to which the radiation shielding principle for radiation therapy is applied, shown in FIG. 20.

As shown in FIGS. 20 and 21, the first shields 200A are provided between the patient's breasts and the second shields 300A, and cover both of the patient's breasts. The first shields 200A are detachably attached to the surface of the wearing member 100A. The first shields 200A include a shield 1A 210A and a shield 1B 220A.

The shield 1A 210A covers one of the patient's breasts. The shield 1A 210A is detachably attached to the surface of the first front part 121A.

The shield 1B 220A covers the other of the patient's breasts. The shield 1B 220A is detachably attached to the surface of the second front part 122A.

At least one of the shield 1A 210A and the shield 1B 220A covers a part of the patient's body between both of the patient's breasts. Therefore, at least one of the shield 1A 210A and the shield 1B 220A covers the coupling member 130A. FIG. 20 illustrates an embodiment in which the shield 1B 220A covers the part of the patient's body between both of the patient's breasts. The shield 1A 210A and the shield 1B 220A extend towards the sides of the patient.

Therefore, during radiation therapy of a body part close to the breasts, such as the liver, pancreas, spleen, kidneys, cervical vertebral, lumbar, head and neck, etc., in order to allow scattered rays to reach the breasts from the front of the chest and the sides of the patient, the scattered rays should pass through the first shields 200A after passing through the second shields 300A.

As shown in FIGS. 17, 18, 20 and 21, the shield 1A 210A and the shield 1B 220A are detachably attached to the surface of the wearing member 100A by first attachment Velcro strips V1A and V1B.

The shield 1A 210A is detachably attached to the surface of the first front part 121A by the first attachment Velcro strips V1A and V1B, and the shield 1B 220A is detachably attached to the surface of the second front part 122A by the first attachment Velcro strips V1A and V1B.

The first attachment Velcro strips V1A and V1B include attachment Velcro strips 1A V1A and attachment Velcro strips 1B V1B. The attachment Velcro strips 1A V1A and the attachment Velcro strips 1B V1B are detachably coupled to each other.

The attachment Velcro strips 1A V1A are provided on the rear surfaces of the shield 1A 210A and the shield 1B 210B. A plurality of attachment Velcro strips 1A V1A is provided along the edge of the rear surface of the shield 1A 210A. Further, a plurality of attachment Velcro strips 1A V1A is provided along the edge of the rear surface of the shield 1B 220A. The attachment Velcro strips 1B V1B are provided on the surfaces of the first front part 121A and the second front part 122A. A plurality of attachment Velcro strips 1B V1B is provided at positions of the surface of the first front part 121A corresponding to the attachment Velcro strips 1A V1A provided on the rear surface of the shield 1A 210A (when the first shield 1A 210A covers the surface of the first front part 121A).

Further, a plurality of attachment Velcro strips 1B V1B is provided at positions of the surface of the second front part 122A corresponding to the attachment Velcro strips 1B V1B provided on the rear surface of the shield 1B 220A (when the second shield 1B 220A covers the surface of the second front part 122A).

As shown in FIGS. 20 and 21, the second shields 300A cover the first shields 200A at the positions of both of the patient's breasts. The second shields 300A are detachably attached to the surfaces of the first shields 200A. The second shields 300A include a shield 2A 310A and a shield 2B 220A.

The shield 2A 310A covers one of the patient's breasts. The shield 2A 310A is detachably attached mainly to the surface of the shield 1A 210A.

The shield 2B 320A covers the other of the breasts. The shield 2B 320A is detachably attached mainly to the surface of the shield 1B 220A.

Figure 22:
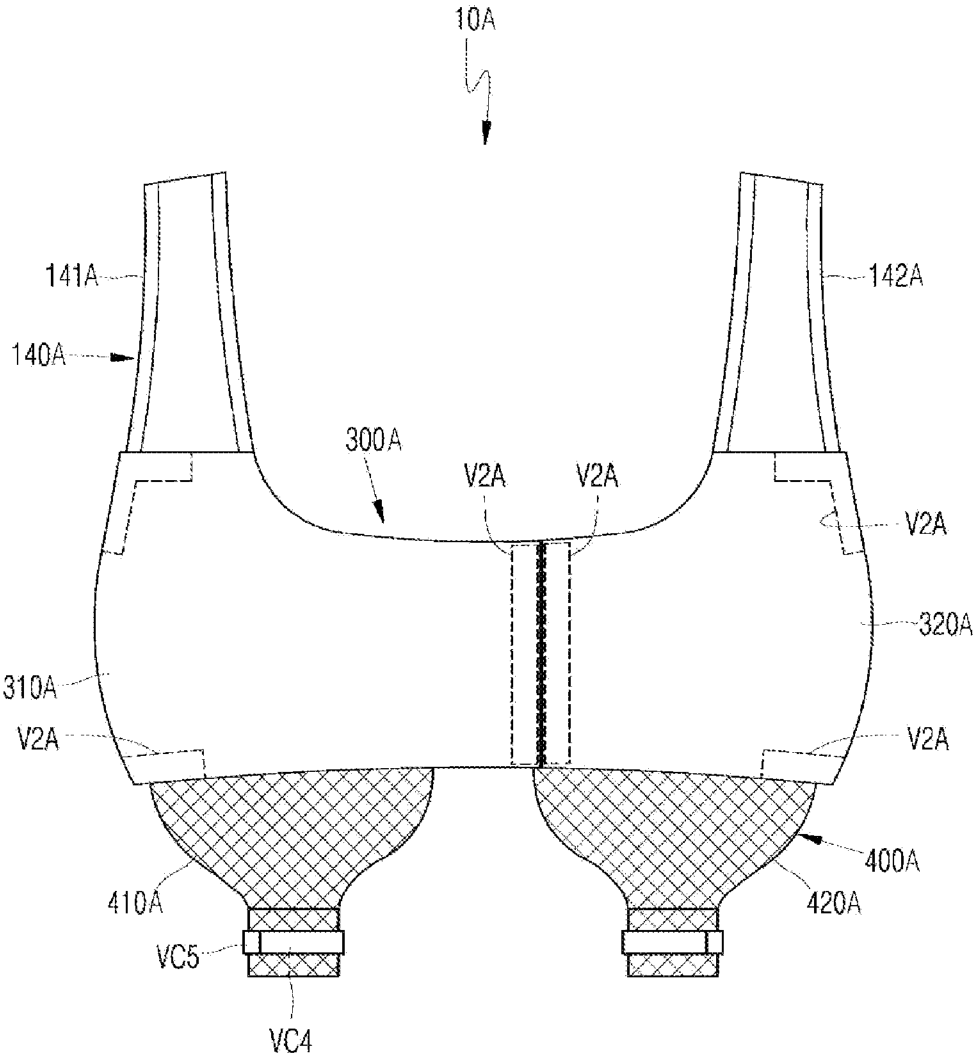
FIG. 22 is a front view showing a state in which the second shields are attached to the first shields of the scattered ray-shielding brassiere, to which the radiation shielding principle for radiation therapy is applied, shown in FIG. 20.

At least one of the shield 2A 210A and the shield 2B 320A covers the part of the patient's body between both of the patient's breasts. FIG. 22 illustrates an embodiment in which the shield 2A 310A covers the part of the patient's body between both of the patient's breasts. Further, the shield 2A 210A and the shield 2B 320A extend toward the sides of the patient.

Therefore, during radiation therapy of a body part close to the breasts, such as the liver, pancreas, spleen, kidneys, cervical vertebral, lumbar, head and neck, etc., in order to allow scattered rays to reach the breasts at the front part of the chest and the sides of the patient, the scattered rays should pass through the second shields 300A after passing through the first shields 200A.

As shown in FIGS. 16, 20, 21 and 22, the shield 2A 310A and the shield 2B 320A are detachably attached to the surfaces of the first shields 200A by second attachment Velcro strips V2A and V2B.

The shield 2A 310A is detachably attached to the surface of the shield 1A 210A mainly in front of the first front part 121A by the second attachment Velcro strips V2A and V2B. The shield 2B 320A is detachably attached to the surface of the shield 1B 220A mainly in front of the second front part 122A by the second attachment Velcro strips V2A and V2B.

The second attachment Velcro strips V2A and V2B include attachment Velcro strips 2A V2A and attachment Velcro strips 2B V2B. The attachment Velcro strips 2A V2A and the attachment Velcro strips 2B V2B are detachably coupled to each other.

The attachment Velcro strips 2A V2A are provided on the rear surfaces of the shield 2A 310A and the shield 2B 310B. A plurality of attachment Velcro strips 2A V2A is provided along the edge of the rear surface of the shield 2A 310A. Further, a plurality of attachment Velcro strips 2A V2A is provided along the edge of the rear surface of the shield 2B 320A.

The attachment Velcro strips 2B V2B are provided on the surfaces of the shield 1A 210A and the shield 1B 220A. A plurality of attachment Velcro strips 2B V2B is provided at positions of the surface of the shield 1A 210A corresponding to the attachment Velcro strips 2A V2A provided on the rear surface of the shield 2A 310A (when the shield 2A 310A covers the surface of the shield 1A 210A).

Further, a plurality of attachment Velcro strips 2B V2B is provided at positions of the surface of the shield 1B 220A corresponding to the attachment Velcro strips 2A V2A provided on the rear surface of the shield 2B 220A (when the shield 2B 320A covers the surface of the shield 1B 220A).

One of the first shields 200A and the second shields 300A may include a substance having a relatively high atomic number, and the other of the first shields 200A and the second shields 300A may include a substance having a relatively low atomic number.

Substances having high atomic numbers may include elements, such as lead (82Pb), tungsten (74W), bismuth (83Bi), barium (56Ba), cadmium (48Cd), and tin (50Sn), and bismuth alloys (bismuth, cadmium, tin, lead, and indium). Further, substances having low atomic numbers may include elements, such as beryllium (4Be), aluminum (13Al), copper (29Cu), and zinc (30Zn), water, paraffin, and polyethylene.

As disclosed in Korean Patent Registration No. 1967664 and Japanese Patent Laid-open Publication No. 2015-225062, shields including elements having high atomic numbers and elements having low atomic numbers are known, and a method of manufacturing the same will thus be omitted.

Various types of radiation, such as high-energy photon beams, electron beams, proton beams, and heavy ion beams, are used in radiation therapy. Further, properties of scattered rays are varied depending on the type of radiation. Therefore, the scattered rays may be effectively shielded using a different shield depending on the type of radiation.

Braking radiation is electromagnetic radiation produced by deceleration of charged particles, such as electrons, when the charged particles are deflected by other charged particles, such as atomic nuclei. When an atomic nucleus attracts and deflects a beta (β-) ray and thus an acceleration is changed, photons with energy equal to an energy difference due to the change in the acceleration of the beta (β-) ray are released.

Negatively charged (−1) beta (β-) rays are attracted by positively charged (+) atomic nuclei. That is, the beta rays are deflected toward the atomic nuclei, and kinetic energy is reduced. As a result, braking radiation is emitted equal to an energy difference.

When substances having high atomic numbers, such as lead (82Pb), tungsten (74W), bismuth (83Bi), barium (56Ba), cadmium (48Cd), tin (50Sn), and bismuth alloys (bismuth, cadmium, tin, lead, and indium), are used as high-energy radiation shields, the degree of deflection of the beta rays is increased, and thus, probability of occurrence of braking radiation is raised. However, the protector for medical imaging of Related Art Document is not capable of preventing exposure to braking radiation, when a substance having a high atomic number is used as a high-energy radiation shield.

The scattered ray-shielding brassiere 10A, to which the radiation shielding principle for radiation therapy is applied, according to one embodiment of the present invention is manufactured such that the first shields 200A include a substance having a relatively low atomic number and the second shields 300A include a substance having a relatively high atomic number, thereby solving the above-described conventional problem.

That is, in the scattered ray-shielding brassiere 10A, to which the radiation shielding principle for radiation therapy is applied, according to one embodiment of the present invention, the second shields 300A primarily shield scattered rays of high-energy radiation, the first shields 200A secondarily shield braking radiation, and, thus, exposure of the patient's breasts to braking radiation is prevented during high-energy radiation therapy.

On the contrary, in the case of low-energy radiation, scattered rays may be effectively shielded only using substances having low atomic numbers, such as beryllium (4Be), aluminum (13Al), copper (29Cu), zinc (30Zn), water, paraffin, and polyethylene. The reason for this is that beta rays release a larger amount of braking X-rays (braking radiation) when beta rays react with a substance having a high atomic number.

Therefore, beta rays should be shielded using a substance having a low atomic number in order to reduce a conversion rate into braking X-rays. However, the protector for medical imaging of Related Art Document is not capable of completely preventing exposure to a small amount of generated braking X-rays, even when a substance having a low atomic number is used as a low-energy radiation shield.

The scattered ray-shielding brassiere 10A, to which the radiation shielding principle for radiation therapy is applied, according to one embodiment of the present invention is manufactured, such that the first shields 200A include a substance having a relatively high atomic number and the second shields 300A include a substance having a relatively low atomic number, thereby solving the above-described conventional problem.

That is, in the scattered ray-shielding brassiere 10A, to which the radiation shielding principle for radiation therapy is applied, according to one embodiment of the present invention, the second shields 300A primarily shield scattered rays of low-energy radiation, the first shields 200A secondarily shield braking radiation, and, thus, exposure of the patient's breasts to braking radiation is prevented during low-energy radiation therapy. Further, in shielding scattered rays of low-energy radiation, only one of the first shields 200A and the second shields 300A may be used upon determining that the patient's breasts may be sufficiently protected using only one of the first shields 200A and the second shields 300A.

Neutron beams do not have any charge, and thus, the moving direction of beta rays is not deflected in the Coulomb's field of an atomic nucleus. Neutron beams collide with the atomic nucleus and lose energy and, in this case, lose energy easily as an atomic number decreases, and therefore, water, paraffin, and polyethylene including a large amount of hydrogen atoms or carbon atoms should be used as shields.

Therefore, during neutron therapy, the first shields 200A are manufactured to include a relatively low atomic number so as to prevent exposure of the patient's breasts to radiation during neutron therapy. During neutron therapy, the second shields 300A may be omitted.

The above-described first attachment Velcro strips V1A and V1B may be detachably attached to the front part 120A and the first shields 200A. Further, the second attachment Velcro strips V2A and V2B may be detachably attached to the first shields 200A and the third shields 300A.

Therefore, the second shields 300A may be attached to the surface of the wearing member 100A, and the first shields 200A may be attached to the surfaces of the second shields 300A. Thus, the positions of the first shields 200A and the second shields 300A may be adjusted depending on the kind of radiation used in radiation therapy.

As shown in FIGS. 14 to 16, the shoulder bands 400A are elements configured to compress the patient's breasts in front of the front part 120A. The shoulder bands 400A may include a first shoulder band 410A and a second shoulder band 420A.

One end of the first shoulder band 410A is coupled to the first front part 121A below the breasts. One end of the second shoulder band 420A is coupled to the second front part 122A below the breasts.

The shoulder bands 400A and the front part 120A may be coupled to each other by sewing, adhesion or heat fusion. Otherwise, the shoulder bands 400A and the front part 120A may be manufactured integrally. The shoulder bands 400A may be formed of an air equivalent material.

For example, the shoulder bands 400A may be formed of carbon fiber woven in the form of a mesh. When the shoulder bands 400A are woven in the form of a mesh, the shoulder bands 400A are easily deformed when external force is applied thereto. Therefore, the compressive force of the shoulder bands 400A is easily adjusted by external force.

Figure 19A:
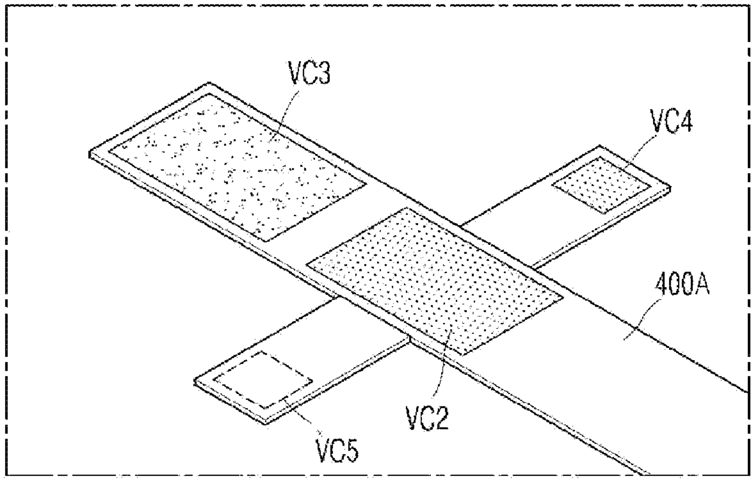
FIG. 19*a* is a perspective view showing a state in which the other end of a shoulder band of the scattered ray-shielding brassiere, to which the radiation shielding principle for radiation therapy is applied, shown in FIG. 15 is unrolled.
Figure 19B:
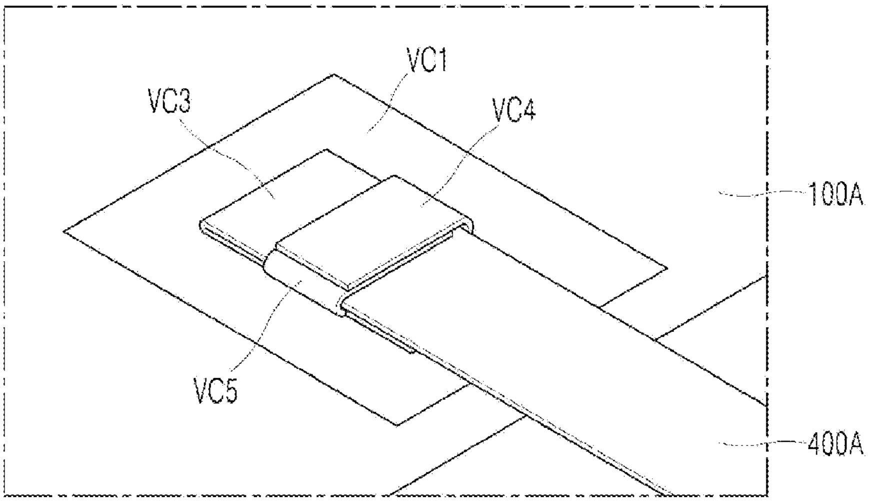
FIG. 19*b* is a perspective view showing a state in which the other end of the shoulder band of the scattered ray-shielding brassiere, to which the radiation shielding principle for radiation therapy is applied, shown in FIG. 15 is detachably coupled to a back part.

As shown in FIGS. 15, 19*a* and 19*b*, the remaining ends of the shoulder bands 400A are detachably coupled to the back part 110A.

The first Velcro strips VC1 are provided on the back part 110A, and the second Velcro strips VC2 detachably coupled to the first Velcro strips VC1 are provided on the remaining ends of the shoulder bands 400A. The shoulder bands 400A and the back part 110A are detachably coupled to each other by the first Velcro strips VC1 and the second Velcro strips VC2. The first Velcro strips VC1 may be formed to have a greater area than the second Velcro strips VC2.

The middle parts of the shoulder bands 400A are adhered to patient's shoulders. When the positions of the second Velcro strips VC2 are adjusted, the detachable coupled positions of the shoulder bands 400A to the back part 110A may be variously adjusted. When the coupled positions of the remaining ends of the shoulder bands 400A to the back part 110A are adjusted, the positions of the patient's breasts may be changed.

The shoulder bands 400A are provided in the form of an overall long band. The shoulder bands 400A are provided in a form having a width which is gradually increased in a direction toward the front part 120A. Therefore, the shoulder bands 400A on the front part 120A cover the breasts.

When the remaining ends of the shoulder bands 400A are coupled to the back part 110A, the shoulder bands 400A in the state of covering the breasts provide elasticity to pull up the lower portion of the front part 120A. Therefore, the shoulder bands 400A pull up the lower breast tissues so as to prevent exposure of the breasts to radiation. The shoulder bands 400A compress the patient's breasts while maintaining a state in which tensile force is applied to the shoulder bands 400A.

When the coupled positions of the remaining ends of the shoulder bands 400A to the back part 110A are respectively adjusted, the compressive forces of the respective shoulder bands 400A on the front part 120A to the patient's breasts are adjusted. Therefore, the patient's chest may be compressed by proper compressive force. Further, even when the breast size and the chest size are changed due to a patient's weight change or only one breast size is changed, the patient's breasts may be stably supported by proper compressive forces.

As shown in FIGS. 19*a* and 19*b*, third Velcro strips VC3 detachably coupled to the second Velcro strips VC2 are provided on the remaining ends of the shoulder bands 400A. At the time of storing and washing the wearing member 100A, when the second Velcro strips VC2 are coupled to the third Velcro strips VC3, damage to the second Velcro strips VC2 and the wearing member 100A, and tangling of the wearing member 100A may be prevented.

A fourth Velcro strip VC4 is provided at one side of the remaining end of each of the shoulder bands 400A based on the second Velcro strip VC2, and a fifth Velcro strip VC5 is provided at the other side of the remaining end of each of the shoulder bands 400A based on the second Velcro strip VC2.

Figure 19C:
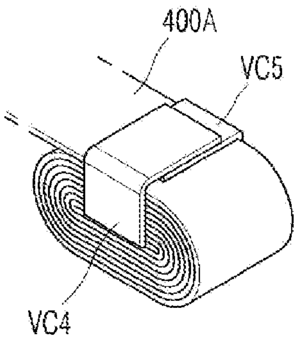
FIG. 19*c* is a perspective view showing a state in which the other end of the shoulder band of the scattered ray-shielding brassiere, to which the radiation shielding principle for radiation therapy is applied, shown in FIG. 18 is rolled in the length direction.

As shown in FIG. 19*c*, when the remaining end of the shoulder band 400A is rolled up in the length direction and then the fourth Velcro strip VC4 and the fifth Velcro strip VC5 are coupled to each other, the rolled-up state of the remaining end of the shoulder band 400A is maintained. Therefore, in order to store and wash the wearing member 100A, when the remaining ends of the shoulder bands 40A are rolled up in the length direction and the fourth Velcro strips VC4 and the fifth Velcro strips VC5 are coupled to each other, damage to the second Velcro strips VC2 and the wearing member 100A, and tangling of the wearing member 100A may be prevented.

Although the exemplary embodiments of the present invention have been disclosed for illustrative purposes, those skilled in the art will appreciate that various modifications and variations are possible, without departing from the scope and spirit of the invention as disclosed in the accompanying claims.

Therefore, all such and other modifications and variations thereto as would be apparent to those skilled in the art are deemed to fall within the broad scope and ambit of this present invention as is herein set forth.

INDUSTRIAL APPLICABILITY

As is apparent from the above description, the scattered ray-shielding underwear for radiation therapy according to the present invention includes the outer underwear formed of the first shielding material and the inner underwear formed of the second shielding material, the first shielding material has a higher atomic number than the second shielding material, and thus, during radiation therapy, the outer underwear may shield scattered rays generated due to high-energy radiation, the inner underwear may shield braking radiation, exposure of a patient to scattered rays and braking radiation may be almost completely blocked, and therefore, the present invention goes beyond the limits of the conventional technologies, has strong possibility of not only use of related technologies but also marketing and sales of apparatuses, to which the present invention is applied, is apparently practicable, and is thus industrially applicable.

The invention claimed is:

1. Scattered ray-shielding underwear for radiation therapy comprising:

outer underwear formed of a first shielding material so as to shield scattered rays generated due to high-energy radiation during radiation therapy; and inner underwear formed of a second shielding material so as to shield braking radiation generated from the outer underwear, wherein the first shielding material has a higher atomic number than the second shielding material.

2. The scattered ray-shielding underwear according to claim 1, wherein:

the outer underwear comprises an outer top and an outer bottom; and the inner underwear comprises an inner top and an inner bottom.

3. The scattered ray-shielding underwear according to claim 2, further comprising first coupling members coupled between the outer top and the inner top so as to maintain an overlapping state between the outer top and the inner top.

4. The scattered ray-shielding underwear according to claim 3, further comprising second coupling members coupled between the outer bottom and the inner bottom so as to maintain an overlapping state between the outer bottom and the inner bottom.

5. The scattered ray-shielding underwear according to claim 4, further comprising third coupling members coupled between the outer top or the inner top and the outer bottom or the inner bottom so as to maintain a coupled state between the outer top or the inner top and the outer bottom or the inner bottom.

6. The scattered ray-shielding underwear according to claim 5, wherein the third coupling members are:

coupled between the outer top and the inner bottom so as to maintain an overlapping state between the outer top and the inner bottom; or coupled between the inner top and the outer bottom so as to maintain an overlapping state between the inner top and the outer bottom; and the third coupling members are Velcro strips configured to extend in a vertical direction so as to adjust a height of a coupling area therebetween.

7. The scattered ray-shielding underwear according to claim 3, further comprising fourth coupling members provided on an outer surface of the outer top and configured to fold up a lower part of the outer top so as to maintain an overlapping state thereof with an upper part of the outer top.

8. The scattered ray-shielding underwear according to claim 7, wherein the fourth coupling members are a plurality of Velcro strips spaced apart from one another in a vertical direction so as to adjust a height of a coupling area therebetween.

9. The scattered ray-shielding underwear according to claim 7, wherein the fourth coupling members are Velcro strips configured to extend in a vertical direction so as to adjust a height of a coupling area therebetween.

10. The scattered ray-shielding underwear according to claim 1, wherein:

the first shielding material is a material selected from a first group consisting of elements having high atomic numbers, comprising lead, tungsten, bismuth, barium, cadmium, and tin, and bismuth alloys, and combinations thereof, and the second shielding material is a material selected from a second group consisting of elements having low atomic numbers, comprising beryllium, aluminum, copper, and zinc, paraffin, plastics, and combinations thereof.

11. The scattered ray-shielding underwear according to claim 10, wherein the outer underwear is formed of a first film fabric formed by stacking films formed of a same material or different materials selected from the first group.

12. The scattered ray-shielding underwear according to claim 10, wherein the outer underwear is formed of a first woven fabric woven from yarns formed of a same material or different materials selected from the first group.

13. The scattered ray-shielding underwear according to claim 12, wherein the first woven fabric comprises one or more first coating layers formed of materials selected from the first group other than the first shielding material selected material(s).

14. The scattered ray-shielding underwear according to claim 10, wherein the inner underwear is formed of a second film fabric formed by stacking films formed of a same material or different materials selected from the second group.

15. The scattered ray-shielding underwear according to claim 10, wherein the inner underwear is formed of a second woven fabric woven from yarns formed of a same material or different materials selected from the second group.

16. The scattered ray-shielding underwear according to claim 15, wherein the second woven fabric comprises one or more second coating layers formed of another material selected from the second group other than the first shielding material.

17. The scattered ray-shielding underwear according to claim 1, further comprising a neck band comprising:

an outer band formed of the first shielding material and configured to surround a neck so as to protect the the neck from radiation; and an inner band coupled to the outer band and formed of the second shielding material.

18. The scattered ray-shielding underwear according to claim 1, further comprising a scattered ray-shielding brassiere, to which a radiation shielding principle for radiation therapy is applied, wherein the scattered ray-shielding brassiere comprises:

a wearing member configured to surround a patient's chest and to cover both of a patient's breasts;

first shields detachably attached to a surface of the wearing member and configured to cover both of the patient's breasts; and second shields detachably attached to surfaces of the first shields and configured to cover both of the patient's breasts, wherein:

one of the first shields and the second shields comprises a substance having a relatively high atomic number; and a remaining one of the first shields and the second shields comprises a substance having a relatively low atomic number.

19. The scattered ray-shielding underwear according to claim 18, wherein:

the first shields comprise:

a shield (1A) configured to cover one of the patient's breasts; and a shield (1B) configured to cover a remaining one of the patient's breasts, wherein at least one of the shield (1A) and the shield (1B) covers a part of a patient's body between both of the patient's breasts; and the second shields comprise:

a shield (2A) configured to cover one of the patient's breasts; and a shield (2B) configured to cover a remaining one of the patient's breasts, wherein at least one of the shield (2A) and the shield (2B) covers the part of the patient's body between both of the patient's breasts.

20. The scattered ray-shielding underwear according to claim 18, wherein the scattered ray-shielding brassiere further comprises shoulder bands configured such that one end of each thereof is coupled to the wearing member below the patient's breasts, and a remaining one end of each thereof is detachably coupled to a back part of the wearing member, wherein, when a coupled position of a remaining end of each of the shoulder band to the back part is adjusted, a position of a corresponding one of the patient's breasts is adjusted, wherein the wearing member comprises:

the back part connected to a patient's back;

a first front part configured to cover one of the patient's breasts and connected to the back part; and a second front part configured to cover a remaining one of the patient's breasts and connected to the back part, wherein:

the first front part and the second front part are coupled by a coupling member between both of the patient's breasts; and the first shields cover the coupling member.

* * * * *